United States Patent
Knop et al.

(10) Patent No.: US 7,043,550 B2
(45) Date of Patent: May 9, 2006

(54) METHOD FOR CONTROLLING GROUP MEMBERSHIP IN A DISTRIBUTED MULTINODE DATA PROCESSING SYSTEM TO ASSURE MUTUALLY SYMMETRIC LIVENESS STATUS INDICATIONS

(75) Inventors: Felipe Knop, Poughkeepsie, NY (US); Tseng-Hui Lin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 748 days.

(21) Appl. No.: 10/077,051

(22) Filed: Feb. 15, 2002

(65) Prior Publication Data
US 2003/0158936 A1 Aug. 21, 2003

(51) Int. Cl.
*G06F 15/173* (2006.01)

(52) U.S. Cl. .................... 709/224; 709/227
(58) Field of Classification Search ........... 709/224, 709/230, 225, 249, 227; 714/25, 47
See application file for complete search history.

(56) References Cited

U.S. PATENT DOCUMENTS

| | | | | |
|---|---|---|---|---|
| 5,793,962 A | * | 8/1998 | Badovinatz et al. | 709/201 |
| 6,138,251 A | * | 10/2000 | Murphy et al. | 714/41 |
| 6,195,760 B1 | * | 2/2001 | Chung et al. | 714/4 |
| 6,411,967 B1 | * | 6/2002 | Van Renesse | 707/201 |
| 6,694,369 B1 | * | 2/2004 | Vepa et al. | 709/228 |
| 2002/0049845 A1 | * | 4/2002 | Sreenivasan et al. | 709/226 |
| 2002/0062217 A1 | * | 5/2002 | Fujimori | 705/1 |

OTHER PUBLICATIONS

IBM U.S. Appl. No.: 09/850,809, "Method for determination of remote adapter and/or node liveness", filed May 8, 2001.

IBM U.S. Appl. No.: 09/580,945, Topology propagation in a distributed computing environment with no topology message traffic in steady state, filed May 30, 2000.

* cited by examiner

*Primary Examiner*—Rupal Dharia
*Assistant Examiner*—Brian J. Gillis
(74) *Attorney, Agent, or Firm*—Scully, Scott, Murphy & Presser; Lawrence D. Cutter

(57) ABSTRACT

In distributed multinode data processing systems, mechanisms are employed to insure that the nodes are continually informed about the liveness of the other nodes within node groups in the network and across networks. The method of the present invention employs the concept of node stability which it uses to provide indications of membership in a previous stable group as part of messages transmitted in a protocol for forming, maintaining and dissolving node groupings in such a way as to assure that all of the nodes in the group have a consistent indication of liveness status for all of the nodes within any given group of nodes.

10 Claims, 25 Drawing Sheets

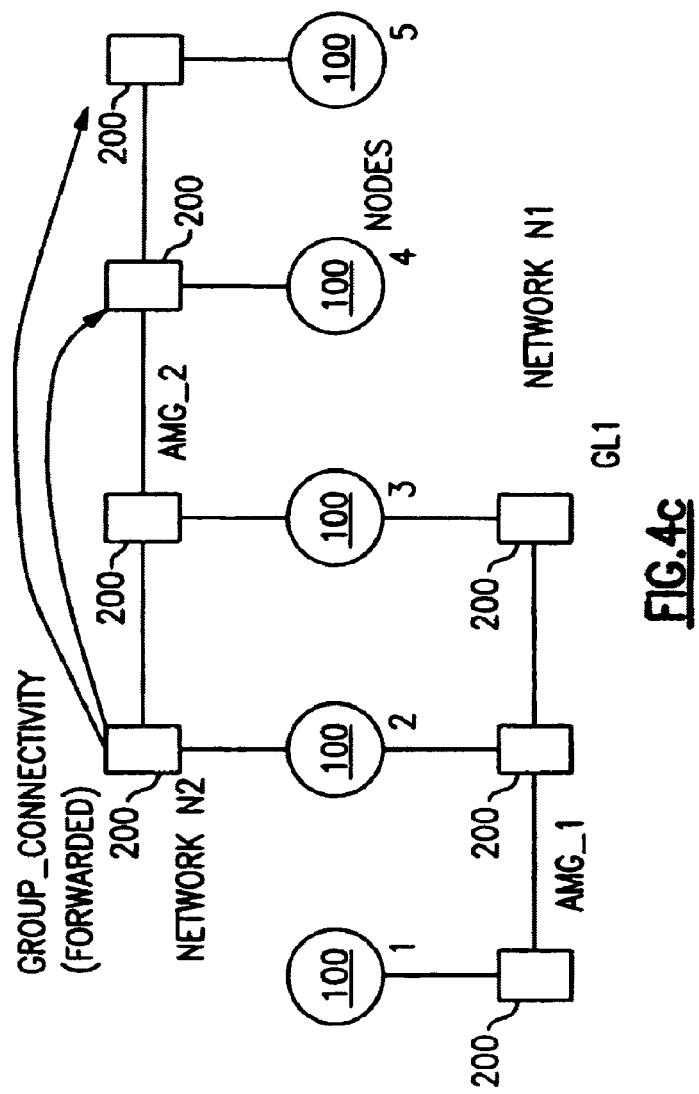

NODE 2

| ADAPTER ID | 1.1.1.2 |
|---|---|
| | 7687 |

| GROUP ID | 1.1.1.3 |
|---|---|
| | 7820 |

GROUP (AMG)

| 1.1.1.3 | 1.1.1.2 | 1.1.1.1 |
|---|---|---|
| 7687 | 7259 | 7228 |

LAST_STABLE_GROUP

| 1.1.1.3 | 1.1.1.2 | 1.1.1.1 |
|---|---|---|
| 7687 | 7259 | 7228 |

NODE 3 (GL)

| 1.1.1.3 |
|---|
| 7687 |

| 1.1.1.3 |
|---|
| 7820 |

| 1.1.1.3 | 1.1.1.2 | 1.1.1.1 |
|---|---|---|
| 7687 | 7259 | 7228 |

| 1.1.1.3 | 1.1.1.2 | 1.1.1.1 |
|---|---|---|
| 7687 | 7259 | 7228 |

COMMUNICATION GLITCH IN NODE 3'S ADAPTER

FIG. 14g

| ADAPTER ID | NODE 2 | | | |
|---|---|---|---|---|
| | 1.1.1.2 | | | |
| | 7687 | | | |

| GROUP ID | 1.1.1.2 |
|---|---|
| | 7897 |

GROUP (AMG)

| | 1.1.1.2 | 1.1.1.1 |
|---|---|---|
| | 7259 | 7228 |

LAST_STABLE_GROUP

| | 1.1.1.2 | 1.1.1.1 |
|---|---|---|
| | 7259 | 7228 |

NODE 3

| 1.1.1.3 |
|---|
| 7687 |

| 1.1.1.3 |
|---|
| 7820 |

| 1.1.1.3 | 1.1.1.2 | 1.1.1.1 |
|---|---|---|
| 7687 | 7259 | 7228 |

| 1.1.1.3 | 1.1.1.2 | 1.1.1.1 |
|---|---|---|
| 7687 | 7259 | 7228 |

FIG. 14b

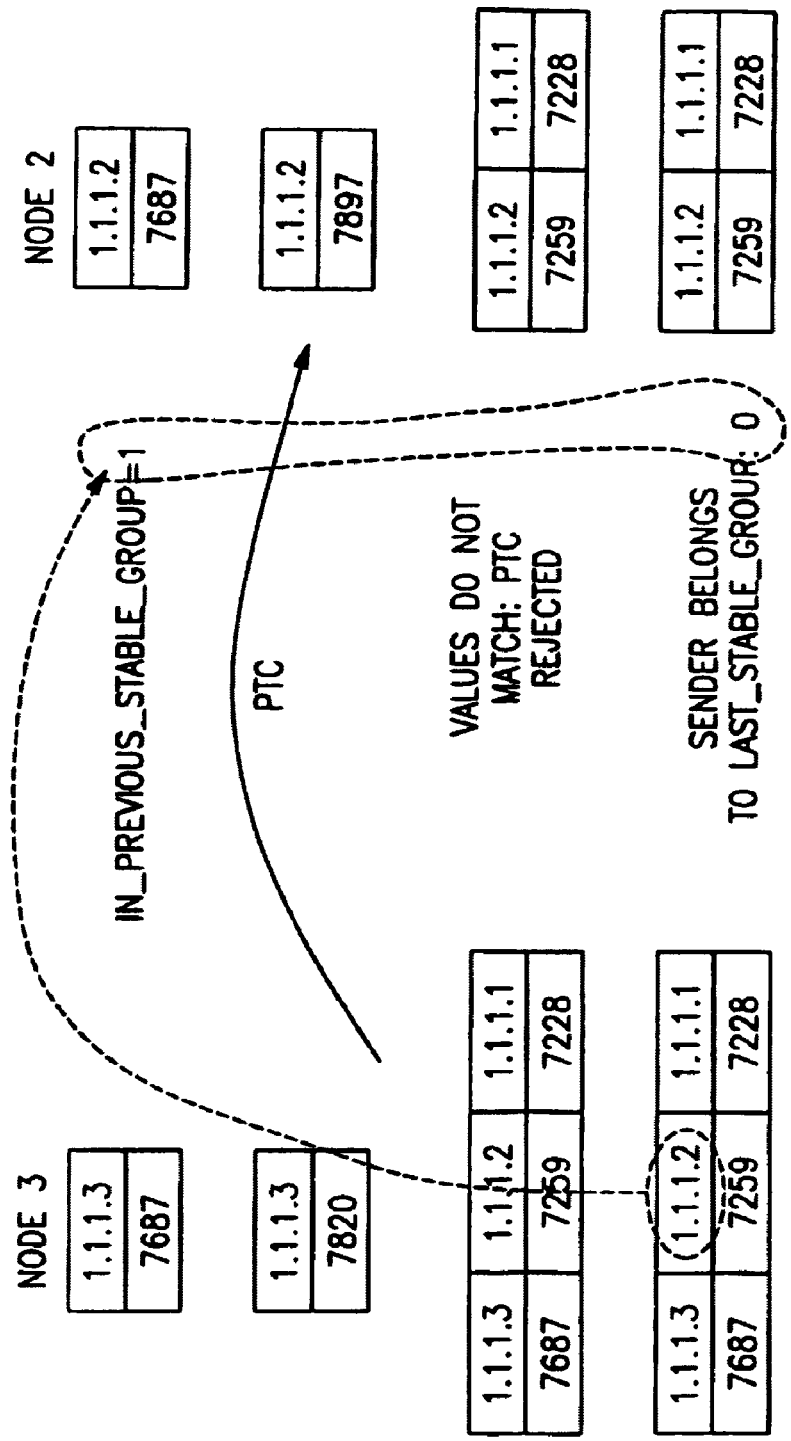

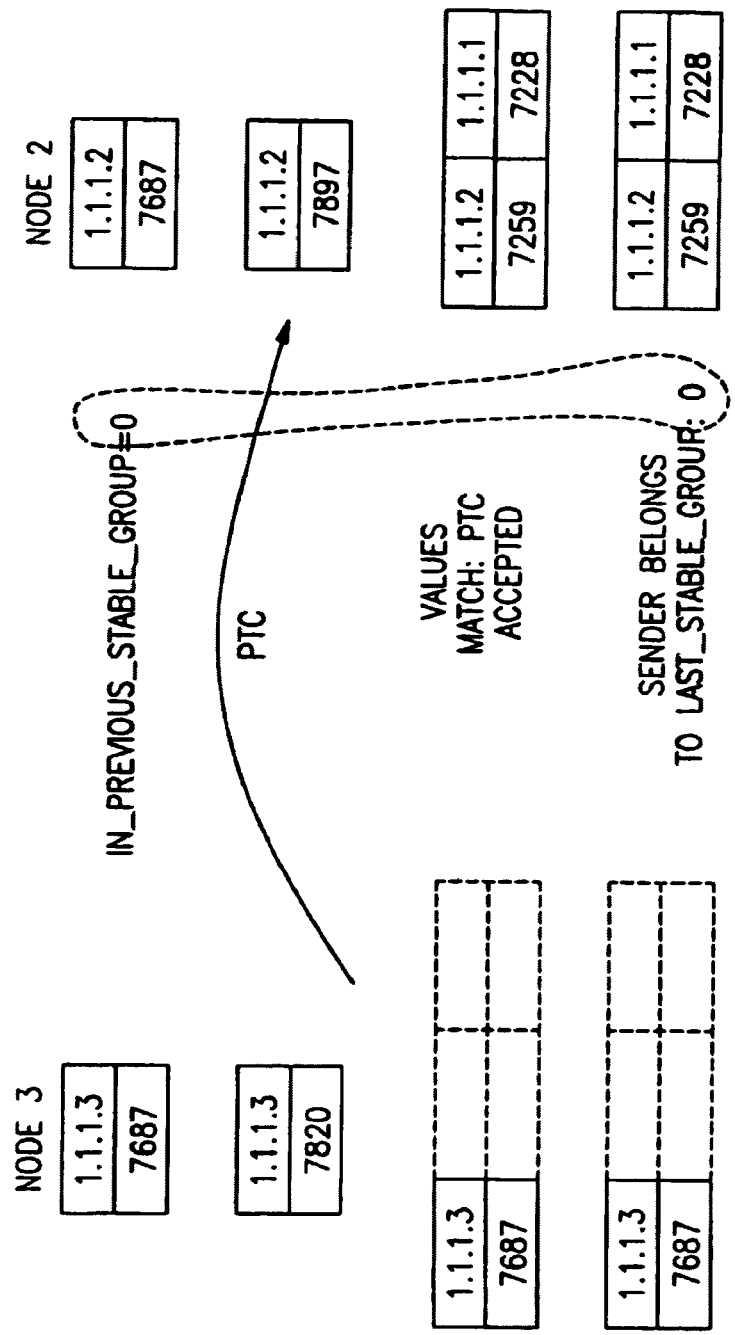

NODE 3 (GL)

| 1.1.1.3 |
|---------|
| 7687    |

| 1.1.1.3 |
|---------|
| 7820    |

| 1.1.1.3 | 1.1.1.2 | 1.1.1.1 |
|---------|---------|---------|
| 7687    | 7259    | 7228    |

| 1.1.1.3 | 1.1.1.2 | 1.1.1.1 |
|---------|---------|---------|
| 7687    | 7259    | 7228    |

NODE 1

| 1.1.1.1 |
|---------|
| 7228    |

| 1.1.1.3 |
|---------|
| 7820    |

| 1.1.1.3 | 1.1.1.2 | 1.1.1.1 |
|---------|---------|---------|
| 7687    | 7259    | 7228    |

| 1.1.1.3 | 1.1.1.2 | 1.1.1.1 |
|---------|---------|---------|
| 7687    | 7259    | 7228    |

ADAPTER ID

GROUP ID

GROUP (AMG)

LAST_STABLE_GROUP

COMMUNICATION GLITCH IN NODE 1'S ADAPTER.

NODE 3: 1.1.1.3 / 7687
GROUP ID: 1.1.1.3 / 7884

NODE 1: 1.1.1.1 / 7228
GROUP ID: 1.1.1.3 / 7820

ADAPTER ID

GROUP (AMG):
- 1.1.1.3 / 7687
- 1.1.1.2 / 7259

LAST_STABLE_GROUP:
- 1.1.1.3 / 7687
- 1.1.1.2 / 7259

GROUP (AMG):
- 1.1.1.3 / 7687
- 1.1.1.2 / 7259
- 1.1.1.1 / 7228

LAST_STABLE_GROUP:
- 1.1.1.3 / 7687
- 1.1.1.2 / 7259
- 1.1.1.1 / 7228

NODE 3

| ADAPTER ID | 1.1.1.3 |
|---|---|
| | 7687 |

| GROUP ID | 1.1.1.3 |
|---|---|
| | 7884 |

NODE 1

| ADAPTER ID | 1.1.1.1 |
|---|---|
| | 7910 |

| GROUP ID | 1.1.1.1 |
|---|---|
| | 7913 |

GROUP (AMG) UNSTABLE

| 1.1.1.1 | 1.1.1.2 | 1.1.1.3 |
|---|---|---|
| 7910 | 7259 | 7687 |

(leftmost column dashed)

LAST_STABLE_GROUP

| 1.1.1.1 | 1.1.1.2 | 1.1.1.3 |
|---|---|---|
| 7228 | 7259 | 7687 |

FIG.15c

METHOD FOR CONTROLLING GROUP MEMBERSHIP IN A DISTRIBUTED MULTINODE DATA PROCESSING SYSTEM TO ASSURE MUTUALLY SYMMETRIC LIVENESS STATUS INDICATIONS

BACKGROUND OF THE INVENTION

The present invention is generally directed to insuring the continuation of consistent group formation events in a distributed topology liveness system, that is, in a multinode data processing system in which node and/or adapter liveness is communicated throughout the system via heartbeat messages, which are messages that are sent periodically and which indicate node and/or adapter liveness. More particularly, the present invention is directed to a method for detecting a situation in which a liveness daemon running on one of the nodes has been subject to a rapid restart. Even more particularly, the present invention is directed to a method for determining the existence of such quick restart events and for providing a proper indication thereof to other nodes within the network, with the particular objective of avoiding grouping inconsistencies which are situations in which one node set sees another node set fail in some way without the other node set being aware of the fact that the first node set has also failed. In short, all of the nodes within a node set should have the same view as to the operating status of the other nodes in the node set.

A proper understanding of the present invention is best obtained from an appreciation of the environment in which it is intended to operate. The present invention is employed in multinode data processing systems. These systems include a plurality of nodes each of which incorporates a data processing element which is coupled locally to its own memory system which typically includes both a volatile random access memory and a nonvolatile random access memory. The volatile memory typically comprises an array of semiconductor memory chips. The nonvolatile memory typically comprises a rotating magnetic or optical storage device. The data processing element also typically comprises a central processing unit (CPU). Each node includes one or more data processing elements. The nodes also include adapters which are communications devices which permit messages to be sent from one node to another node or to a plurality of other nodes. Internodal communications typically take place through a switch device which routes transmitted messages to destination nodes within the system.

In order to carry out various data processing functions, the nodes within any given multinode network are organizable into sets of nodes. Nodes and/or their associated adapters sometimes experience problems, delays or failures. Accordingly, from time to time during the operation of individual nodes, system checks are undertaken to make sure that the nodes are still alive and functioning. This checking is performed via heartbeat message transmissions. Each node in the system is assigned one or more "downstream" nodes for the purpose of periodically sending a message indicating liveness status. In preferred embodiments, heartbeat signals are only sent to a single other node. However, it is quite easy to instead employ a predefined list of node destinations for receipt of heartbeat signals from any or all of the nodes in the network. These liveness message transmissions are handled by daemon programs running on the various nodes in the system.

Distributed multinode data processing systems of the kind contemplated herein employ heartbeat messaging protocols which are used to control group membership which, of course, shifts over time. It is control of the membership process to which the present invention is directed. This membership process typically includes the establishment of one of the nodes in a group as the so-called Group Leader (GL). The Group Leader acts as a coordinator for nodes coming into (joining) or for nodes exiting the group. Additionally, in the event that there is a problem with the Group Leader, there is preferably also a designated second node which is intended to act as a replacement for the Group Leader in the event that the Group Leader experiences a failure. This second, backup Group Leader is referred to as the Crown Prince. In the context of the present invention, the Group Leader and Crown Prince are employed in the "liveness" (heartbeating) layer. The present invention should not be confused with group membership services which are provided to "end user applications." In accordance with the present invention, "group membership," as referred to above, refers to the list of members in an Adapter Membership Group which occurs on each network being monitored. On the other hand, "node reachability" refers to the set of nodes that are considered to be alive, taking all of the adapter membership groups into consideration. In particular, it is noted that the notion of "node reachability" may include message hops through indirect paths that may cross network boundaries. This set of nodes is supplied from the "liveness layer" to the "group communications layer" which runs on top of the "liveness" layer.

More particularly, the present application is concerned with two different scenarios which present potential problems with respect to group membership consistency across the nodes of the system or network. Accordingly, there is provided a method for determination of adapter and node death in a distributed system whereby node events are made consistent, that is, when a first node sees another node as being "down," the second other node, if alive, is still able to see the first node as being "down" within finite amount of time. When a node actually suffers a "permanent" crash the heartbeat mechanism, together with the associated "join" protocol, is able to provide sufficient control and communications amongst the remaining nodes to assure maximum functionality. Accordingly, the present invention does not come into play when nodes crash, since the basic heartbeat mechanism is able to cope with this situation; nonetheless, the present invention becomes important when communication failures and process blockages result in temporary loss of contact amongst a set of distributed peers in the liveness determination subsystem. The present method addresses two possible scenarios which could lead to inconsistent node grouping situations: (1) a node where the liveness daemon is stopped and restarted quickly; and (2) a node whose communications with the rest of the nodes suffers a temporary interruption.

In situations in which the liveness daemon running on one of the nodes is stopped and restarted in a short period of time, certain consistency problems can be engendered. For example, typically it happens that when the liveness daemon restarts, for each local adapter, a message is transmitted which "proclaims" the existence and the willingness of the sending node to become a group leader; it is, in generic terms, a request to know which other nodes are "out there." These aspects are discussed in more detail below where the nature of the "PROCLAIM" message is considered. However, the other nodes in the group still consider the restarting node (and/or adapter) as being part of the previous group. Accordingly, group membership is no longer consistent in the sense that there is a lack of symmetry among the various nodes with regards to the "known" status of the other nodes.

When this situation is caused by the "quick" restart of the liveness daemon, it is referred to herein as the "bouncing node" problem or scenario.

Likewise, a problem can occur if a first node, say Node 1, has a temporary communication problem. If the problem lasts long enough for the other nodes to expel Node 1 from the group, but not long enough for the local adapter to be declared down, the other nodes can form a new Adapter Membership Group, G2, while the adapter at Node 1 is still considered as being part of the previous group, G1 (which contains all the adapters). The adapter at Node 1 then attempts to dissolve the group, since it will have gotten no answer to a liveness ("DEATH") message that it sent when its old upstream neighbor stopped sending heartbeat signals to it. (For a discussion of a more specific and preferred characterization of the notion of dissolving a group, attention is directed below to Section 2.2). Upon "dissolving" the group, the adapter at Node 1 reinitializes into a "group" with only a single node, which is referred to herein as a singleton group and it resumes operation. Singleton groups are inherently unstable groups since they are typically destined to soon experience a change to inclusion in a larger group. If this all happens before the adapter on Node 1 is able to form a stable group, then Node 1 never sees any "node down" events, where the other nodes see Node 1 as being "down," especially if this is the only adapter group to which Node 1 belongs. Accordingly, the recognition of this problem brings along with it the notion that some groups are more stable (from time to time) than other groups, and that special handling is required to insure group membership consistency across the network.

SUMMARY OF THE INVENTION

In accordance with a preferred embodiment of a first aspect of the present invention, there is provided a method for detecting the quick restart of liveness daemons in a distributed, multinode data processing system in which the nodes communicate liveness indicia in the form of heartbeat messages via adapters coupled to each node. In this method a first message (PROCLAIM) is sent from a first node to other nodes in the network that do not yet belong to the local node's adapter membership group. This message contains some indicia that the sending node has recently experienced an adapter restart. This information, together with locally stored group membership information, is used to determine that a quick restart has actually occurred at the sending node. This situation is handled by expelling the node from the group as a means for insuring correct group membership status.

In accordance with a preferred embodiment of a second aspect of the present invention, there is provided a method for detecting node reachability inconsistencies in the presence of temporary node communication failures or temporary daemon blockage. To accomplish this, an indication of a last stable adapter membership group is maintained at each node. The group join protocol is thus enabled to provide a PREPARE_TO_COMMIT (PTC) message which includes a flag which indicates that the message recipient is considered as belonging to the same stable membership group as the message sender. As used herein, the term "stable" refers to a characteristic for a node or node group which implies that there is only a small likelihood that group membership for that node or node group will change in the near future. In particular, nodes that find themselves isolated as the only members of a group try to join a group as soon as possible. Therefore, such singleton groups are referred to herein as being inherently unstable.

Accordingly, it is an object of the present invention to insure the existence of consistent group membership information across a plurality of nodes in a distributed, multinode data processing system.

It is also an object of the present invention to provide a mechanism to guard against group membership inconsistencies which might arise as the result of the failure and quick restart of a node and/or one of more of its associated adapters.

It is a further object of the present invention to employ existing group membership control protocols as a mechanism for communicating proper group membership status.

It is yet another object of the present invention to insure proper group membership status in the face of temporary node communication failures.

It is a still further object of the present invention to insure proper group membership status in the face of temporary node daemon blockages.

It is also an object of the present invention to provide an indication that a node is included within a stable group.

It is yet another object of the present invention to provide an indication of stability for the nodes in a data processing network.

It is also an object of the present invention to increase the reliability and availability of distributed data processing systems.

It is also an object of the present invention to expand the capabilities of Topology Services in terms of its utility without significantly altering any of its application programming interfaces (APIs) or its protocols.

Lastly, but not limited hereto, it is an object of the present invention to provide a cooperative relation between the first and second aspects of the present invention (quick restart and failed communications, respectively) to particularly address the problem of assuring consistent node viewpoints with respect to adapter group membership and node reachability.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 4C is a schematic block diagram illustrating group connectivity across two networks and the forwarding of group connectivity information;

FIGS. 14A through 14D are a sequence of block diagrams illustrating a solution to the problem of communication interruption that occurs when Node 3's adapter suffers a temporary failure;

FIG. 14B is a schematic block diagram following FIG. 14A in time and more particularly illustrating the point in time that Node 2 commits to a new Adapter Membership Group while Node 3 is still in the process of missing heartbeat messages from its neighbor;

FIG. 14C is a schematic block diagram following FIGS. 14A and 14B in time and more particularly illustrating the point in time that Node 3 sends a PTC message when it stops receiving heartbeat messages from its upstream neighbor and also particularly showing the rejection of the PTC messages because of discrepancies in the last_stable_group results;

FIG. 14D is a schematic block diagram following FIGS. 14A, 14B and 14C in time and more particularly illustrating the fact that Node 3 is forced into a singleton group at which point it updates its last_stable_group indicator;

FIGS. 15A through 15E are a sequence of block diagrams similar to FIGS. 14A through 14D which particularly illustrate the situation in which Nodes 1, 2 and 3 are part of the same Adapter Membership Group;

FIG. 15B is a block diagram following FIG. 15A in time and more particularly illustrating the situation in which, as a result of a temporary failure in Node 1, Node 3 commits to a new Adapter Membership Group while Node 1 is still in the process of missing heartbeat messages from its upstream neighbor;

FIG. 15C is a block diagram following FIG. 15B in time which illustrates the course of action, following that shown in FIG. 115B, in which Node 1 dissolves its group and forms a singleton (and thus an unstable) group;

FIG. 15D is a block diagram following FIG. 15D in time which illustrates the course of action, following that shown in FIG. 15C, in which Node 3 sends a PTC message when Node 1 responds to the PROCLAIM message with a JOIN message; and FIG. 15E is a block diagram illustrating the course of action, following that shown in FIG. 15D, in which since Node 3 does not get replies to its PTC messages, it is eventually forced to form a singleton group.

DETAILED DESCRIPTION OF THE INVENTION

1.0 Controlling Group Membership

Figure 1:
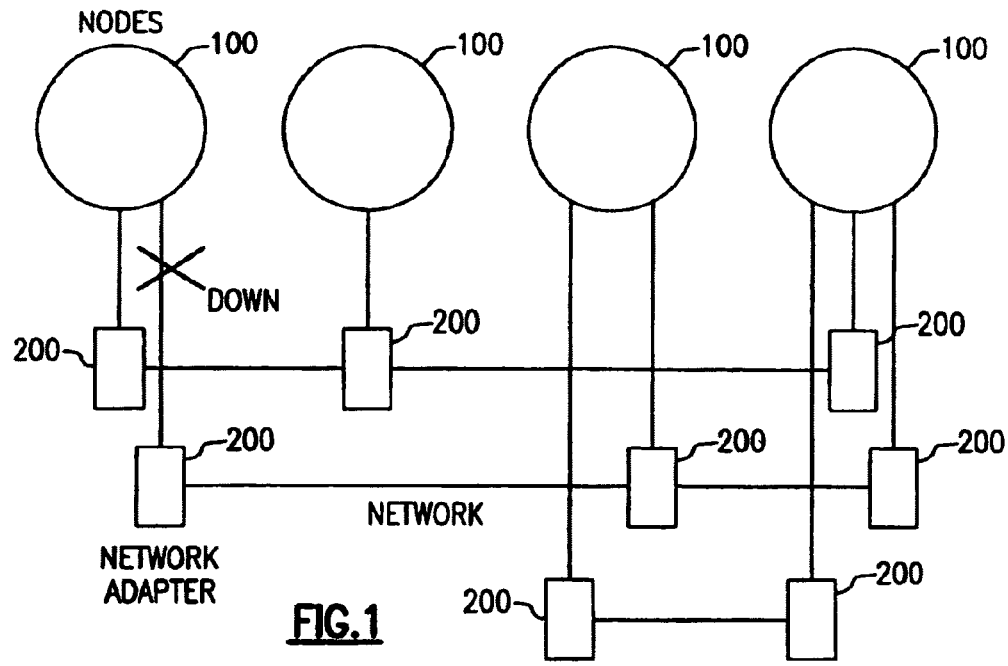
FIG. 1 is a schematic block diagram illustrating the connections of multiple nodes to one or more networks through a plurality of adapters.

Adapter and node liveness determination lies at the heart of any highly available distributed cluster data processing system. In order to provide high availability services, a cluster system should be able to determine which nodes, networks, and network adapters in the system are working and be able to accurately determine the group or groups to which they belong. The failure in any such component should be detected as soon as possible and indications of such failure should be passed along to higher level software subsystems for recovery processing by the cluster software and/or applications running on the cluster.

Determination of node, network, and network adapter liveness is often made through the use of daemon processes running on each node of the distributed system. Daemons run distributed protocols and exchange liveness messages that are forced through different network paths in the data processing system. If no such liveness messages are received within a predetermined time interval, then the sending node or network adapter is assumed to be not working ("dead") by the other nodes.

Any method of liveness determination can subjected to "false down" events, where nodes or network adapters are incorrectly notified as being down or unreachable. Such false events may happen, for example, when temporary communication failures prevent the liveness messages from reaching their destination(s). False "node down" events may also happen when the liveness determination daemon is prevented from being scheduled because of CPU scheduling, memory contention, excessive interrupts, and other factors. The daemon being stopped is yet another source of false "node down" notifications.

In the presence of these false events, it is important to provide consistent node reachability notifications: when a node sees the other node as down, the other node—if alive—should see the first as down within a finite, preferably predetermined, time interval. The absence of such consistency may lead to undesirable effects, since software layers above the liveness determination "layer" may be unable to reach an agreement regarding the topology's health (that is, the configuration of nodes within a group together with identifiable paths by which one node may be reached from another), with different nodes having different views of which nodes are reachable.

2.0 Heartbeat Protocols

To explain the mechanisms of the present invention, and how they are employed in Topology Services (a set of system utility programs and defined API calling structures), adapter membership ("heartbeating") protocols in the subsystem are explained herein in some detail. Topology Services is the layer in the infrastructure which is responsible for detecting the health of adapters, nodes, and networks.

In order to monitor the health and connectivity of the adapters in each network, all adapters in the network attempt to form at least one "Adapter Membership Group" (AMG), which is a group containing all network adapters within the network that can communicate with each other. Adapters in an AMG monitor the "liveness" of each other. When an AMG is formed, all group members receive an "AMG id" (that is, a unique group membership identifier) which identifies the AMG. If, at some point in time an adapter fails, it is expelled from the group, and new adapters that are powered up are invited to join the group. In both cases, a new AMG with a new "AMG id" is formed. Each AMG has one member that is the Group Leader (GL), and all members know who the Group Leader is. Note that a node may belong to several AMGs, one for each of its (network) adapters.

Each AMG has an id, which is included in all protocol messages. The group id includes the GL identification (chosen to be its Internet Protocol (IP) address) and an instance number (chosen to be the time stamp of which indicates when the AMG was formed). Note that the group id is chosen to be the IP address for convenience and that any scheme for assigning a unique and sequentially orderable identifier may be employed.

Each member of an AMG also has an id, which includes the member identification (chosen to be its IP address) and an instance number (chosen to be the time stamp of when its daemon was started or when its adapter was reinitialized).

To determine the set of adapters that are alive in each network, an adapter membership protocol is run in each of the networks. Messages in this protocol are sent using UDP/IP ("User Datagram Protocol"/"Internet Protocol").

Adapters that are alive form an AMG, where members are organized in a virtual ring topology. To ensure that all group members are alive, each member periodically sends "HEART BEAT" messages to its "downstream neighbor" and monitors "HEART BEAT" messages from its "upstream neighbor." Protocols are run when adapters fail or when new adapters become functional. The goal of such protocols is to guarantee that the membership group contains at each moment all (and only) the adapters in the network (but only those belonging to the cluster) that can communicate with each other.

Besides the Group Leader, each group has a "Crown Prince" (backup group leader). The group leader is responsible for coordinating the group protocols, and the Crown Prince is responsible for taking over group leadership if the group leader, or its adapter, fails. Both the choice of Group Leader and Crown Prince, and the position of the adapters in the ring, are determined by a predefined adapter priority rule, which is typically chosen to be the adapters' IP address, hence the desire, as stated above, that its indicia be able to provide a sort into a unique ordering sequence.

A list of all possible adapters in each network is contained in a configuration file that is read by all of the nodes at startup and at reconfiguration time.

2.1 Join Protocol

In order to attract new members to the group, the Group Leader in each group periodically sends "PROCLAIM" messages to adapters that are in the adapter configuration but do not currently belong to the group. The message is only sent to adapters having a lower IP address than that of the sender. See FIGS. 2A through 2G and the discussion in Section 7 below.

The "PROCLAIM" messages are ignored by all adapters that are not group leaders. A Group Leader node receiving a "PROCLAIM" message from a higher priority (higher IP address) node responds with a "JOIN" message on behalf of its group. The message contains the membership list of the "joining group."

A node GL1 (Group Leader #1) receiving a "JOIN" message from GL2 (Group Leader #2) attempts to form a new group containing the previous members plus all members in the joining group. GL1 then sends a "PTC" ("Prepare To Commit") message to all members of the new group, including GL2.

Nodes receiving a "PTC" message reply with a "PTC_ACK" message. All nodes from which a "PTC_ACK" message is received are included in the new group. The group leader (GL1) sends a "COMMIT" message, which contains the entire group membership list, to all new group members.

Receiving a "COMMIT" message marks the transition to the new group, which now contains the old members plus the joining members. After receiving this message, a group member starts sending "HEART BEAT" messages to its (possibly new) downstream neighbor, and starts monitoring "HEART BEAT" messages from its (possibly new) upstream neighbor.

Both "PTC" and "COMMIT" messages require an acknowledgment to ensure they have been received. If no acknowledgment is received then a finite number of retries is made. Failure to respond to a "PTC" message—after all retries have been exhausted—results in the corresponding adapter not being included in the new group. If a liveness daemon fails to receive a "COMMIT" message after all retries of the "PTC_ACK" message, then the local adapter gives up the formation of the new group and reinitializes itself into a singleton group. This phenomenon should only occur in the relatively rare case where the Group Leader fails in the short time window between sending the "PTC" message and the "COMMIT" message.

When the Topology Services daemon is initialized, it forms a singleton adapter group (of which the node is the Group Leader) in each of its adapters. The node then starts sending and receiving "PROCLAIM" messages.

2.2 Death Protocol

A node or adapter monitors "HEART BEAT" messages coming from its "upstream neighbor" (the adapter in the group that has the next highest IP address among the group members). When no "HEART BEAT" messages are received for some predefined period of time, the "upstream neighbor" is assumed to have failed. A "DEATH" message is then sent to the group leader, requesting that a new group be formed. See FIGS. 3A through 3C and the discussion in Section 7 below.

Upon receiving a "DEATH" message, the group leader attempts to form a new group containing all adapters in the current group except the adapter that was detected as failed. The group leader sends a "PTC" message to all members of the new group. The protocol then follows the same sequence as that described above for the Join protocol.

After sending a "DEATH" message, the daemon expects to receive a "PTC" message shortly. A number of retries is attempted, but if no "PTC" message is received then the interpretation is that the GL adapter (or its hosting node) died and that the "Crown Prince" adapter also died, and therefore was unable to take over the group leadership. In this case the adapter reinitializes itself into a singleton group and also sends a "DISSOLVE" message, inviting all group members to do the same. This is the mechanism that allows all members of the group to find out about the simultaneous demise of the Group Leader and Crown Prince member nodes.

2.3 Node Reachability

A node reachability protocol is used to allow computation of the set of nodes that are reachable from the local node (and therefore considered alive). Since not all nodes may be connected to the same network, some nodes may be reachable only through a sequence of multiple network hops. Complete node reachability determinations can only be computed when information about all networks, even those that do not span all nodes, is taken into account.

To compute node reachability, an eventual agreement protocol is used: reachability information at each network is propagated to all networks; when the network topology stops changing, eventually all nodes have consistent information about all networks. Each node is then be able to compute the set of reachable nodes independently and arrive at a consistent result.

Periodically, and until some stopping criteria instruct the daemon to stop doing so, the nodes send the following messages:

- a "Node Connectivity Message" (NCM) which is sent from all group members to the Group Leader. A Node Connectivity Message for a given network contains the AMG id for that network plus all of the "disabled AMG ids" for the local adapters that are disabled. A node sends NCMs to each Group Leader of the groups to which the local adapters belong. The Group Leader stores all the information coming from the NCM's in a "Node Connectivity Table" (NCT). The NCT stores the (local view of the) global network topology, and contains the AMG id for each node and network adapter in the system. Any two nodes that have the same AMG id are assumed to be connected to each other by the same network; and
- a "Group Connectivity Message" (GCM) which is sent from each Group Leader to all group members. The GCM contains the AMG id and the list of nodes that belong to the AMG. Also, for each of these nodes, a list of all "disabled AMG ids" (in the other networks) is included. The information needed to send the GCM is extracted from the Group Leader's Node Connectivity Table. A node that receives a GCM updates its own Node Connectivity Table with the information in the message. If a daemon receiving a GCM notices that there are some groups to which the local adapters belong, whose members have not received that GCM, the daemon forwards the GCM to these groups. The goal is to propagate the GCM to all of the nodes in the system, even those that are not directly connected to the network that originated the GCM. Notice that the information sent in an NCM and GCM is a subset of the sender's NCT.

See FIGS. 4 and 5, and the discussion in Section 7 below.

2.4—Stable/Unstable AMGs

To prevent "panic" actions of the protocol—such as those caused by the absence of a "COMMIT" after all "PTC ACKs" or by the simultaneous failure of the Group Leader and the Crown Prince—from causing major node reachability ripples, the concept of "stable" and "unstable" AMGs is now defined. Stable AMGs are those where steady state operations are occurring, while unstable AMGs are those where membership changes are still likely to occur (such as for singleton groups).

At initialization, singleton Adapter Membership Groups start in the unstable state, since it is expected that the adapter will join other peers in bigger groups. The change into a stable group occurs after an inactivity period where membership changes stop occurring. Once a group is stable, it remains stable until the adapter is forced to reinitialize itself because of a "panic" action.

AMG stability is tied to the Node Connectivity Table and to sending the Node Connectivity Message and the Group Connectivity Message in the following way: to prevent unnecessary node reachability ripples, no information about unstable groups is sent in NCMs and GCMs. This effectively removes unstable groups from the computation of node reachability, and has the desirable effect of eliminating the knowledge of some temporary membership changes from the software layers above.

3.0 Node Event Inconsistency

3.1—Inconsistency Caused by Quick Restart

A liveness daemon which stops (on request or due to a problem) and is then quickly restarted offers a chance for inconsistency to occur. In order to best appreciate this phenomenon, consider the following sequence of events which occurs when a daemon is stopped and then quickly restarted:

(1) the daemon at Node A is stopped;

(2) the daemon at Node A restarts and, for each local adapter, initiates sending "PROCLAIM" messages;

(3) the other nodes still consider Node A as part of the previous group. This situation continues until Node A is detected as dead on each of the AMGs due to lack of "HEART BEAT" messages coming from Node A;

(4) Node A is finally detected as dead in each AMG and is expelled from the group; and (5) Node A is then finally allowed to rejoin each AMG.

The delay in "(3)" causes the following problems:

(1) reintegration of the "bouncing" node is seen as occurring too slowly; and (2) if different networks have very different detection times, it is possible that Node A may be detected as being down and thereafter rejoins one of the groups before being ever detected as down in another network (which has a longer detection time). The net result is that, when node reachability is computed by the other nodes, Node A is never seen as going down at all.

The problem with the scenario in (2) above is that the daemon that restarted starts anew, with no memory of the previous AMG. If other nodes never detect that the node "failed," then they cannot take actions to integrate the node into the higher level node group.

3.2—Inconsistency Caused by Quick Communication Interruption

Some node event inconsistency problems are possible because of the inherent behavior of the base adapter membership protocols. The following are two examples of scenarios that could lead to inconsistent events.

(1) Node 1 has a temporary problem in its adapter. The problems lasts long enough for the other nodes to expel Node 1 from the group, but not long enough for the local adapter to be declared down. While the other nodes form a new AMG G2, the adapter at Node 1 initially considers itself still as part of the previous G1 (which is assumed in this example to contain all of the adapters). The adapter at Node 1 then attempts to dissolve the group, since it got no answer to its "DEATH" message that it sent when its old upstream neighbor stopped sending heartbeat messages to it. Upon "dissolving" the group, the adapter at Node 1 then reinitializes into a singleton unstable group and resumes operation. If the adapter is working again, "PROCLAIM" messages eventually arrive, and the adapter is brought back into the group. If this all happens before the adapter on Node 1 can form a stable group, then Node 1 never sees any node down events, whereas the other nodes will have seen Node 1 as down if this is the only adapter group to which Node 1 belongs.

(2) This next example is similar to the one above, but this time it is assumed that Node 1 used to be the Group Leader. During the temporary outage, other adapters in the AMG form group G2 and expel the adapter at Node 1. Node 1 only perceives that it was expelled from the group when the heartbeats from its upstream neighbor stop coming. At some point, Node 1 declares the upstream neighbor dead and simply sends a "PTC" message to its old group membership. The other nodes, upon seeing the "PTC" message from an adapter with higher priority, immediately respond to the "PTC" message, and a new group G3 is formed. While the other nodes will have seen Node 1 failing and then coming back, Node 1 does not actually see the others failing (except possibly for its old upstream neighbor). Node 1 is completely oblivious to being expelled from the adapter group.

4.0 Detection of Bouncing Nodes

The detection of "bouncing nodes" (that is, nodes where the liveness daemon exits for any reason and is then restarted within a short period of time) is based on the bouncing nodes and the live nodes finding about the bounce by using normal liveness protocol messages.

4.1 Live Nodes Detect Bouncing Nodes

One way by which the current nodes in the group can detect bounced members is by receiving "PROCLAIM" messages from them. The "PROCLAIM" message can indeed reveal that the source of the message is a bounced entity by determining that all three of the conditions indicated below exist:

(1) the group id of the message is different from the recipient's group id (since the bouncing daemon is definitely now using a different group id—at least the instance number part);

(2) the IP address of the sender of the message is still listed as part of the current group; and (3) the instance number of the sender's adapter id is different from the one listed as group member (the instance number changes when the adapter is reinitialized or when the daemon starts).

If a "PROCLAIM" message is received where all three of the conditions listed above are true, then the assessment is that the message came from a group member that bounced. To speed up the detection of the bounce and to allow faster reintegration of the bouncer, the best course of action is to expel it from the group, which can be done by sending a "DEATH" message for the bouncing adapter.

Since the "PROCLAIM" message is likely to reach all group members, then all of them would try to send a "DEATH" message for the bounced adapter, which is wasteful. The alternative is for only the bouncer's downstream neighbor to send the message. Accordingly, such a process is indicated in the pseudo-code provided below:

```
Handling a "PROCLAIM" message
    if ( from_group != from my group id  &&
         from_IP_address is still part of my group   &&
         from_Instance != from the id that is in the group  &&
         I am the id's downstream neighbor ) {
         send a "DEATH" message for id
    }
```

One additional method for detecting a bounced daemon includes a step wherein a bounced daemon sends a "JOIN" message even before the Group Leader is notified about the demise of the adapter.

Though "PROCLAIM" messages are usually sent only to adapters which are not currently part of the AMG, implementations of the present protocol may, if desired, use a hardware broadcast to send the message, in which case even members of the AMG may receive the message. In this case, the Group Leader receives a "JOIN" message from an adapter which is still member of the group. This situation can be recognized as a "bounce" by the GL, which then invokes the PTC-COMMIT sequence to expel the adapter from the group.

4.2—Bounced Nodes Detect That They Bounced

Normally, a daemon that bounces starts anew with no memory of a previous instance. On the other hand, a bounced daemon that used to be part of a group is likely to receive "HEART BEAT" messages from its old "upstream neighbor." Such "HEART BEAT" messages tell the bouncing daemon that it bounced quicker than the time it takes to detect a remote adapter as dead.

Again, the goal is to cause the bouncing adapter to be expelled from the previous group as soon as possible. The first thought which occurs as a method for accomplishing this goal is for the daemon that receives such a "HEART BEAT" message to send a "DEATH" message for itself, but this does not work because the bouncing daemon does not know who the Group Leader is, and therefore does not know to whom to send the "DEATH" message. In addition, the Group Leader may have itself been the recipient of the message (that is, the node that bounced). The solution to this problem is for the bouncing daemon to send a new "NOT YOUR NEIGHBOR" message back to the sender of the "HEART BEAT" message. The recipient of this message, being part of the previous group and knowing who the Group Leader is, reacts by sending a "DEATH" message to the Group Leader. Accordingly, such a process is indicated in the pseudo-code provided below:

```
Receiving a "HEART BEAT" message which is not to the current group:
    if ( I am part of a singleton group ) {
        Reply with "NOT YOUR NEIGHBOR" message
    }
Receiving a "NOT YOUR NEIGHBOR" message:
        if (sender's IP address is part of my group ) {
            Find id corresponding to the IP address
            Send a "DEATH" message to GL for the id
}
```

5.0 Solution to the Quick Communication Interruption Problem

The steps described below are carried out to address the two situations cases described above in section 3.2. The object of performing these steps is to force both sides of a merging group to see roughly the same events prior to the merge.

(1) Each node keeps, for each local adapter, a copy of the last stable AMG to which the local adapter belongs ("last_stable_group"). The rationale for keeping only the stable groups is that only stable groups result in the desire for node reachability to be recomputed.

(2) When sending a "PTC" message, the sender adds an "in_previous_stable_group" flag to the message, according to whether the destination belonged to the last_stable_group AMG—usually the previously formed AMG prior to the new group being committed.

(3) When processing a "PTC" message, a node handles two pieces of information: (1) the "in_previous_stable_group" in the message; and (2) whether the sender of the message belongs to the receiver's "last_stable_group" group. Unless these 2 pieces have the same TRUE/FALSE value, the "PTC" message is rejected.

The mechanism above withstands both examples in section 3.2 above and is also effective in more normal cases, such as when two AMGs merge in a PROCLAIM-JOIN-PTC sequence. See section 6.2 below.

6.0—Sample Scenarios

Some scenarios are presented to depict how the protocols presented herein work to effect their various purposes. In the case of multiple bouncing two of the separate protocols described herein work together in a cooperative fashion to further assure consistent group membership.

6.1—Detection of Bouncing Nodes

(a) Single Bounce

After a daemon "bounces," either of the bouncing detection mechanisms should be activated, in any case resulting in the bouncing "adapter" being removed from the group. Since this happens in all AMGs more or less simultaneously, the node is effectively detected as dead by the others before it can rejoin the AMGs.

(b) Multiple Bounces

This example considers the case wherein there are multiple bouncing adapters, that is, when a number of nodes bounce, while others fail. The concern here is what happens when a bouncing daemon quickly joins in a group with some other adapter whose daemon also bounced. Not being the Group Leader of the group, the daemon does not send any "PROCLAIM" messages. In addition, when multiple nodes bounce it may happen that a bouncing daemon's upstream neighbor has also bounced. Therefore the usual mechanisms are not active in causing the bouncing adapter to be expelled.

This situation is salvaged by the methods of the present invention through the observation that at least one of the bouncing daemons becomes the Group Leader in its new group; the others might become members of this very same group. The Group Leader sends "PROCLAIM" messages periodically, resulting in a "DEATH" message being sent for it. The Group Leader of the original group then attempts to form a new group, but then none of the bouncing daemons should reply to the "PTC" message. This happens because the quick communication interruption mechanism described in section 5.0 above comes into play: the bouncing daemon is still part of the Group Leader's group, while the Group Leader itself is not be part of the bouncing node's (possibly singleton) group. The result is that the "PTC" message is ignored.

6.2—Quick Communication Interruption Problem

EXAMPLE 1 (IN 3.2)

In this example, the sender of the "PTC" message has G2 (Group 2) indicated as the last_stable_group. Since the destination ("Node 1") does not belong to G2, the "in_previous_stable_group" indication in the "PTC" message is set to "FALSE." Upon receiving the message, Node 1 first sees the value of in_previous_stable_group: FALSE. It then examines whether the sender belongs to last_stable group. For Node 1, last_stable_group is G1 (Group 1), and the sender does belong to it (when Node 1 dissolves the group, it forms a singleton group, but it is an unstable one.) Node 1 therefore sees that the two pieces of information are inconsistent. Therefore, Node 1 rejects the message. Node 1 keeps rejecting the "PTC" message until the stability timer expires (typically after about 10 seconds) and Node 1 becomes stable. At this point, Node 1 produces a new last_stable_group indication which does not contain the sender of the "PTC." Consequently, the next "PTC" is accepted, since the two pieces of information are consistent. When Node 1 forms a stable singleton group, it sends a node notification saying that all of the other nodes disappeared. And that is the goal: the notification is symmetric to that seen in the other nodes.

EXAMPLE 2

In this example, Node 1 has G1 (Group 1) designated as the last_stable_group. The other nodes all have G2 (Group 2) designated as the last_stable_group. All of the "PTC" messages have TRUE as an indicator for being "in_previous_stable_group," since all of the recipients belonged to G1. On the other hand, the sender of "PTC" (Node 1) does not belong to G2 (the recipients' last_stable_group), so again there is an inconsistency, and the "PTC" is rejected. The same thing happens again until Node 1 forms a singleton stable group.

Group Merge

Suppose AMG Group 1 (G1) has nodes 1 and 2, while Group 2 (G2) has Nodes 3 and 4. Node 2, which is assumed to be G1's Group Leader sends a "JOIN" message to Node 4, which is G2's Group Leader. Node 4 then sends a "PTC" message to Nodes 1, 2, and 3. For Node 1, the in_previous_stable_group indicator is "FALSE," since Node 1 does not belong to G2. Node 1 itself has Node 4 as not part of the "last_stable_group" (G1). The same is true for Node 2. For Node 3, the in_previous_stable_group indicator is "TRUE," since Node 3 belongs to G2. Node 3 itself has Node 4 as part of the "last stable group" (G2). The end result is that all nodes accept the "PTC", as expected.

Real Group Dissolve

If the Group Leader and Crown Prince fail at the same time, the "third in line" dissolves the group, and all of the adapters in the group form an unstable singleton group. Slowly the remaining members coalesce into a single group. Since the last_stable_group indicators contain the group prior to the dissolve, the "PTC" issued during the coalesce phase are accepted.

Daemon is Blocked

This example actually also falls under Example 2 above. If the daemon is blocked for too long and the adapter was expelled from its AMGs, then the node with the blocked daemon eventually forms a singleton stable group for all of its adapters.

7.0—Discussion in Terms of Related Drawings

The environment in which the present invention is employed is shown in FIG. 1. In particular, there is shown a plurality of nodes 100 connected in a network via network adapters 200. Though not specifically shown in the figures herein, the network typically includes a switch which routes messages from source nodes to destination nodes in the network of nodes. FIG. 1 also particularly illustrates the possibility that one of the nodes may experience a failure. This failure could occur with the node itself or within the network adapter through which it is coupled to the other nodes.

Figure 2A:
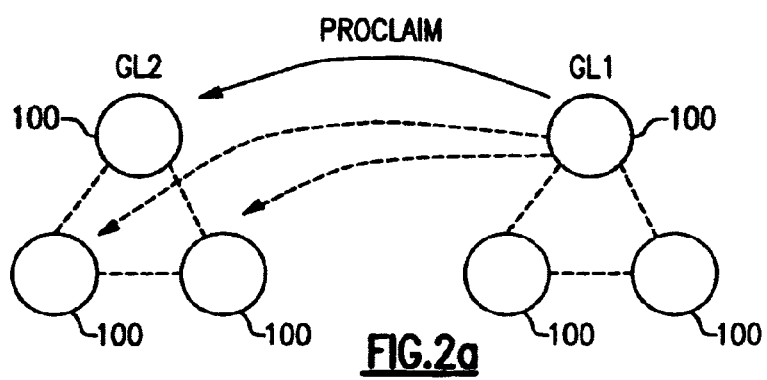
FIG. 2A is a schematic block diagram illustrating the transmission of a PROCLAIM message as part of a join protocol.
Figure 2B:
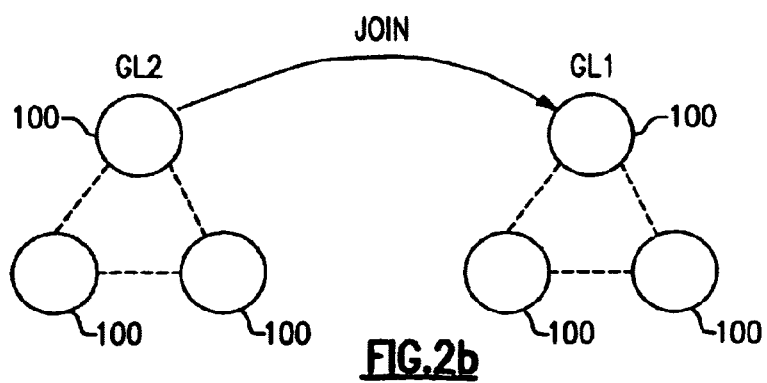
FIG. 2B is a schematic block diagram illustrating the JOIN response to a PROCLAIM message.
Figure 2C:
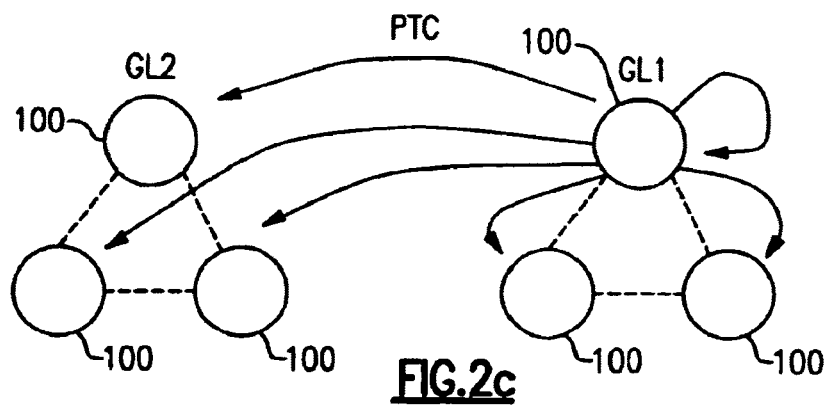
FIG. 2C is a schematic block diagram illustrating the transmission of the PREPARE_TO_COMMIT (PTC) message as part of a group joining protocol.
Figure 2D:
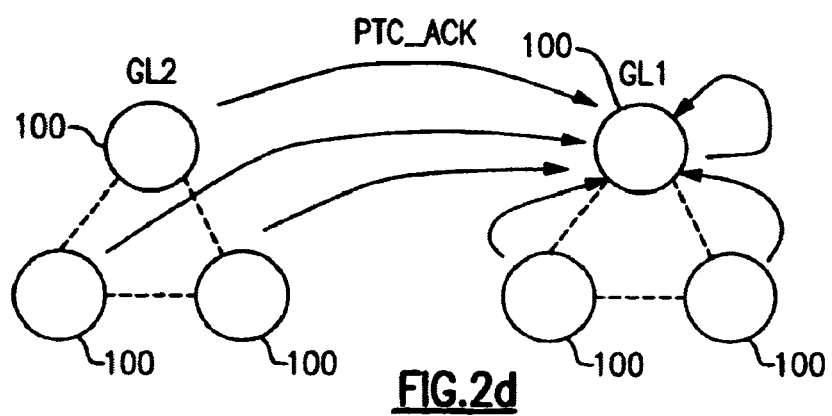
FIG. 2D is a schematic block diagram illustrating the transmission of the PTC_ACK (prepare to commit acknowledgment) message in response to the PTC message.
Figure 2E:
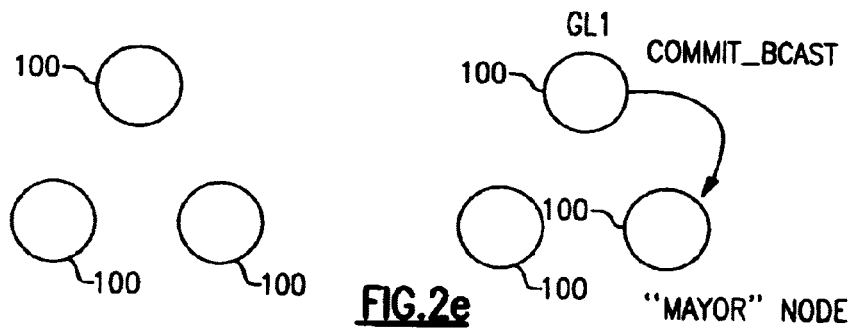
FIG. 2E is a schematic block diagram illustrating the transmission of the COMMIT_BCAST (broadcasted commit) message.
Figure 2F:
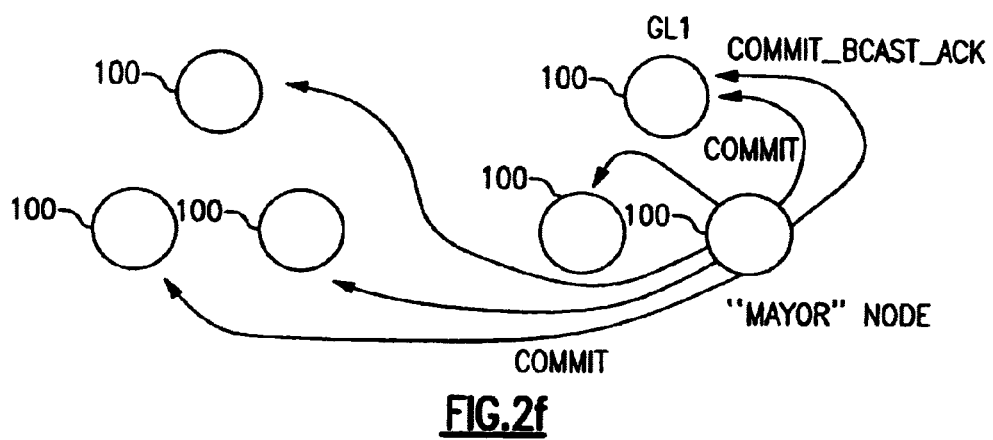
FIG. 2F is a schematic block diagram illustrating the transmission of an acknowledgment to the COMMIT_BCAST message.
Figure 2G:
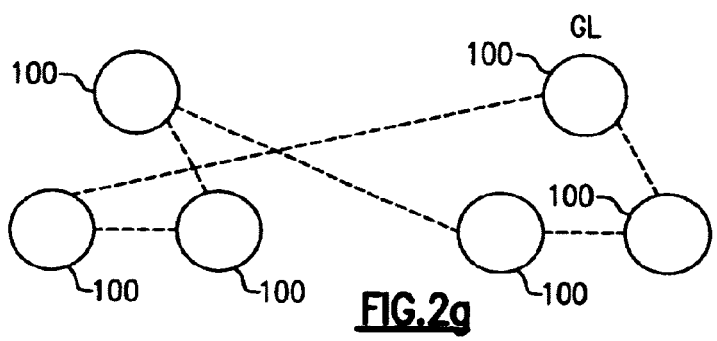
FIG. 2G is a schematic block diagram illustrating the new group formed as a result of the messages transmitted in FIGS. 2A through 2F and further illustrates the flow graph for the subsequent transmission of heartbeat messages.

FIGS. 2A through 2G illustrate the process in which nodes are added to a node group. This process is initiated by Group Leader #1 (GL1) in a first group sending out a PROCLAIM message to other nodes in a global collection of hardware nodes, as shown in FIG. 2A. In particular, the PROCLAIM message is sent to Group Leader #2 in a second, already existing, group of nodes. In general, it is the object to have all of the nodes that count themselves as being in a certain group fully cognizant of all of the other nodes in the group. It is also important to keep in mind that a node may belong to more than one network. The join protocol calls for Group Leader #2 to reply to the PROCLAIM message with a JOIN message which is communicated back to Group Leader #1, as shown in FIG. 2B. In accordance with the joining protocol, Group Leader #1 responds to receipt of the JOIN message by sending out a PREPARE_TO_COMMIT message (PTC) to all of the nodes that have been identified as part of either of the two groups, as shown in FIG. 2C. This includes the fact that Group Leader #1 also effectively sends the PTC message to itself. All of the nodes, including Group Leader #1, responds to the PTC message by sending Group Leader #1 an acknowledgment message (PTC_ACK). As shown in FIG. 2D, this also includes Group Leader #1, as above. In a preferred embodiment of the join protocol, Group Leader #1 sends a "commit to broadcast" message (COMMIT_BCAST) to a "Mayor" node whose job it is to send an acknowledgment of the COMMIT_BCAST message to all of the other nodes. Thus, FIG. 2F depicts the transmittal of the COMMIT_BCAST_ACK message to all of the other nodes, including Group Leader #1. At this point in time, every node in the group is aware of the existence and network address of every other node that is part of the new node group. Knowledge of the network address is in particular useful in establishing an ordered, closed loop linkage between the nodes in the group. Since the network address is unique and capable of having a numerical ordering from low to high or from high to low, it is an extremely convenient marker for establishing the next neighbor in the node group for transmission of a heartbeat message. Such a closed loop is illustrated in FIG. 2G. The direction of heartbeat message transmission is not critical. It is only important that all of the nodes in the group receive it from an "upstream" node. Although heartbeat messages are sent in a "circular fashion," they are not actually passed along from one node to another in a bucket brigade manner. The timing for receiving a heartbeat message packet and for sending a heartbeat packet are independent activities that is to say, a node does not wait to receive a heartbeat message before sending one.

Figure 3A:
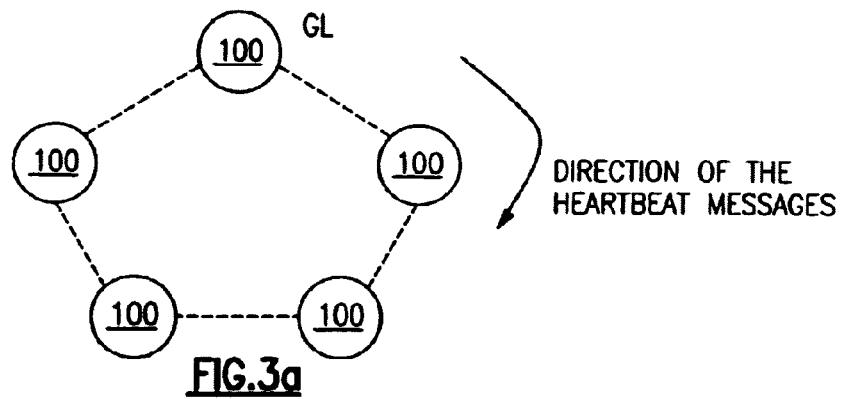
FIG. 3A is a schematic block diagram illustrating the heartbeat message path at the beginning of the protocol dealing with node and/or adapter death (failure)
Figure 3B:
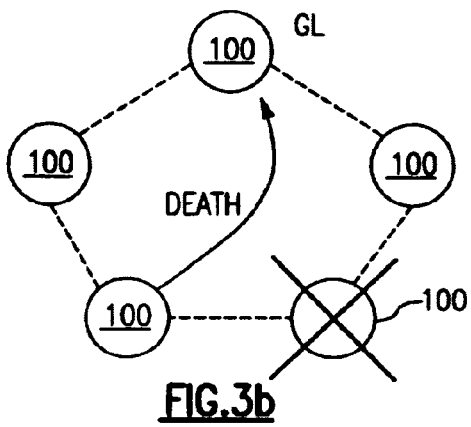
FIG. 3B is a schematic block diagram illustrating the transmission of a DEATH message to the Group Leader in the event that the node at the lower right fails to pass along its heartbeat message.
Figure 3C:
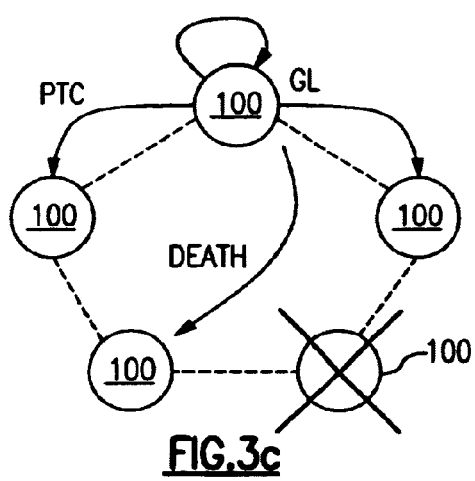
FIG. 3C is a schematic block diagram illustrating the beginning of the chain of events which follows the receipt of a DEATH message, namely the transmission of the PREPARE_TO_COMMIT message.

FIG. 3A is a simplification of FIG. 2G showing the assumed direction for the flow of the heartbeat messages. If the node in the lower right hand portion of FIG. 3A fails, as is suggested by the large "X" in FIG. 3B, the downstream node, having expected to receive a heartbeat message within a prescribed period of time, informs the Group Leader that his upstream node has died. This is accomplished by sending a "DEATH" message to the Group Leader (GL). The Group Leader now "realizes" that a node has died and that a new node group should be formed. Upon receipt of the "DEATH" message, the Group Leader sends out a "PREPARE_TO_COMMIT" message in the same fashion as shown above in FIG. 2C. See FIG. 3C.

Figure 4A:
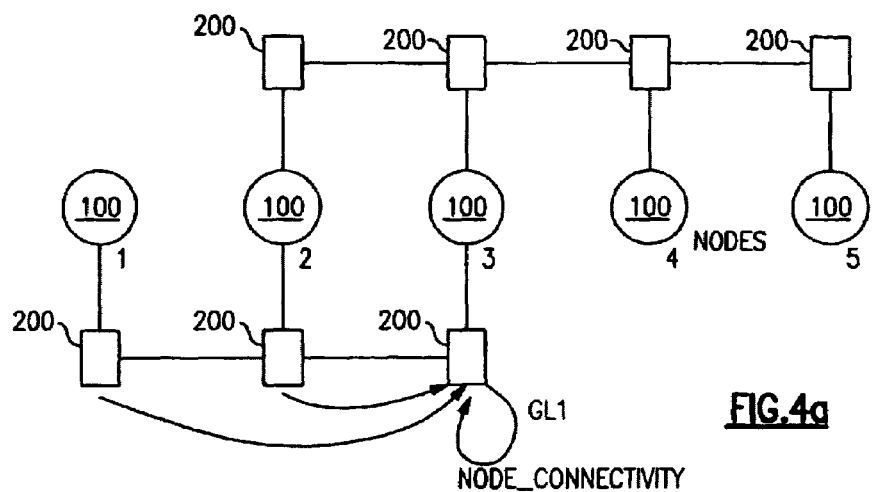
FIG. 4A is a schematic block diagram illustrating transmission to the Group Leader of the NODE_CONNECTIVITY message.
Figure 4B:
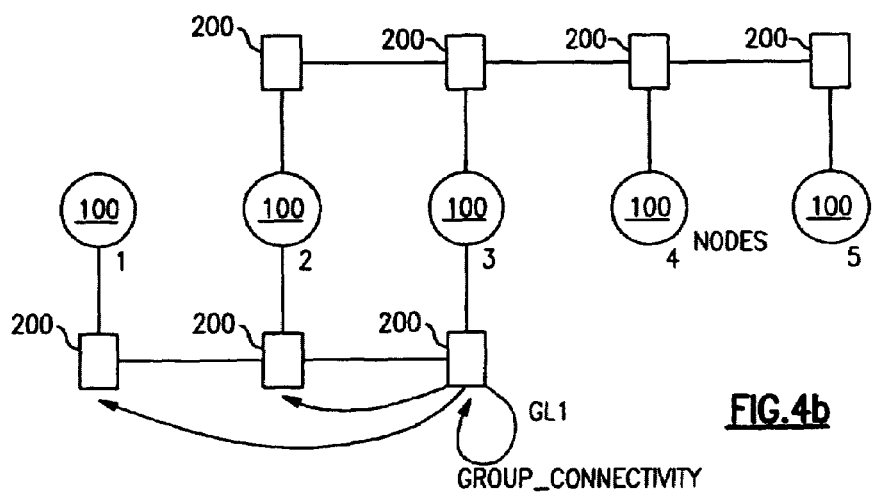
FIG. 4B is a schematic block diagram illustrating transmission to the Group Leader of the GROUP_CONNECTIVITY message.

FIGS. 4A, 4B and 4C illustrate the fact that a node may in fact have one or more attached network adapters and thus be connected to more than one node group or node network. It also illustrates the fact that to reach another node it might be the case that one or more network "hops" might have to be employed. Thus, it becomes very useful for nodes that are connected through a set of network adapters be "aware of" one another. This awareness is accomplished by transmitting a Node Connectivity Message (NCM) to a Group Leader through the Group Leader's adapter. For example, as shown in FIG. 4A, connectivity between Node #1 and Node #5 requires a path through two different networks. As shown in FIG. 4B, a "Group Connectivity Message" (GCM) is sent from each Group Leader to all group members. The GCM contains the Adapter Membership Group (AMG) id and the list of nodes that belong to the AMG. Also, for each of these nodes, a list of all "disabled AMG ids" (in the other networks) is included. FIG. 4C illustrates the forwarding of the Group Connectivity Message in Network #2.

Figure 5A:
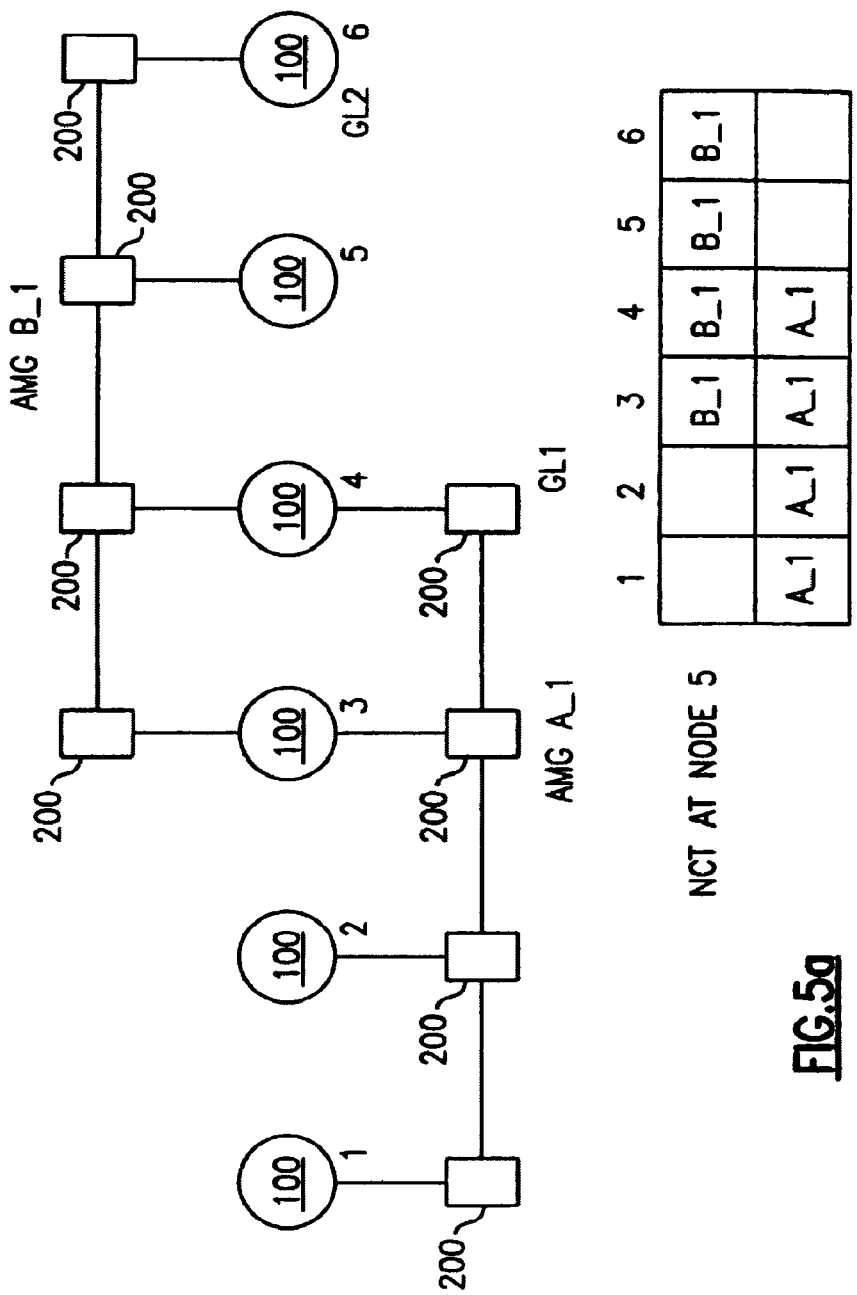
FIG. 5A is a schematic block diagram illustrating an initial state for the Node Connectivity Table just prior to the occurrence of a node failure (death)
Figure 5B:
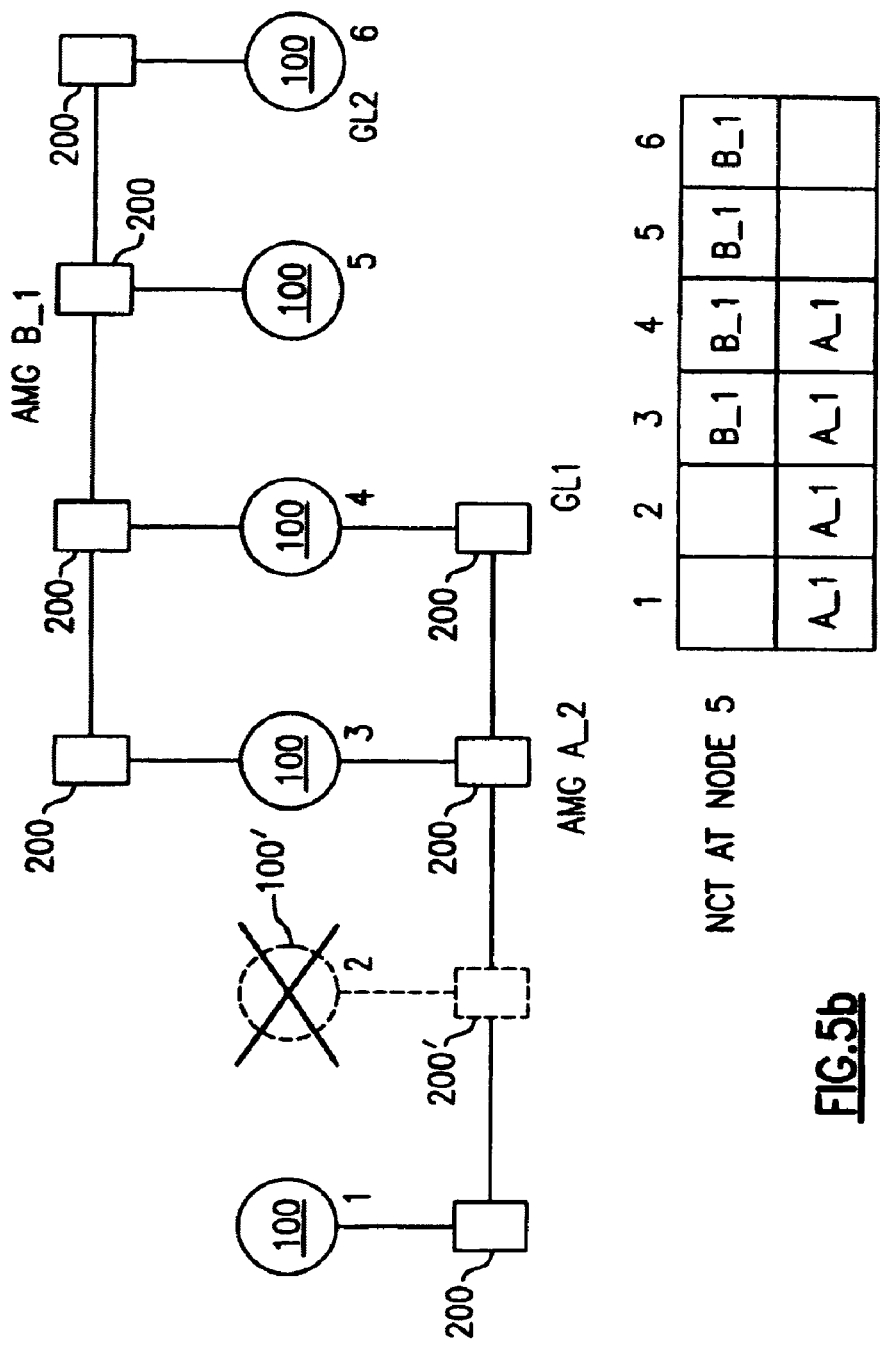
FIG. 5B is a schematic block diagram illustrating the death of Node 2 and the formation of Nodes 1, 3 and 4 into Adapter Membership Group A_2.
Figure 5C:
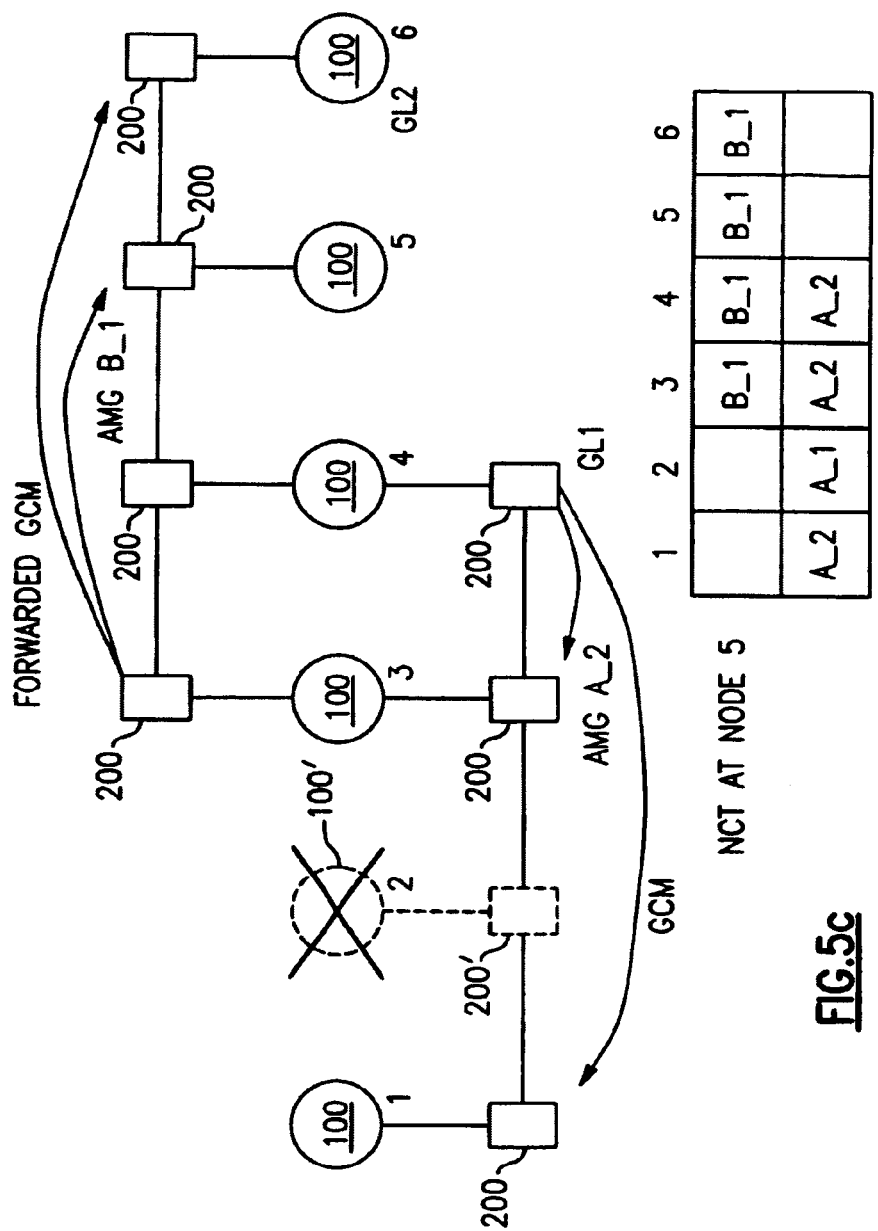
FIG. 5C is a schematic block diagram illustrating the propagation of the Group Connectivity Message to all nodes.

As indicated above, node reachability is maintained across the network by means of a Node Connectivity Table. Such a table, with its concomitant entries, is shown in FIG. 5A for the network and node interconnections shown in FIG. 4. In particular, the NCT shown shows two groups and two networks. Adapter Membership Group A_1 includes Node #1, Node #2, Node #3 and Node #4. In this group, Node #4 is the Group Leader (GL1). Adapter Membership Group B_1 includes Node #3, Node #4, Node #5 and Node #6 with Node #6 being the Group Leader (GL2) in AMG B_1. This structure is reflected in the Node Connectivity Table that exists at Node #5, as shown. In particular, the initial Node Connectivity Table shown if FIG. 5A is included to illustrate the state of the system just prior to a node death. In this death scenario, Node #2 is assumed to have failed. As shown in FIG. 5B, the death of Node #2 results in the formation of a new group from the remaining nodes. This Adapter Membership Group A_2 is formed from Node #1, Node #3 and Node #4. The group forming process preferably employs the protocols set forth above with particular reference to FIGS. 2 and 3. This group formation is communicated to the other nodes in the network via the Group Connectivity Message (GCM), as illustrated in FIG. 5C. As each node receives the GCM, it updates its own Node Connectivity Table. A NCT with updated entries for Node #5 is shown in FIG. 5C. In this manner, all of the nodes in the network are made aware of group membership and "liveness" status.

Figure 6:
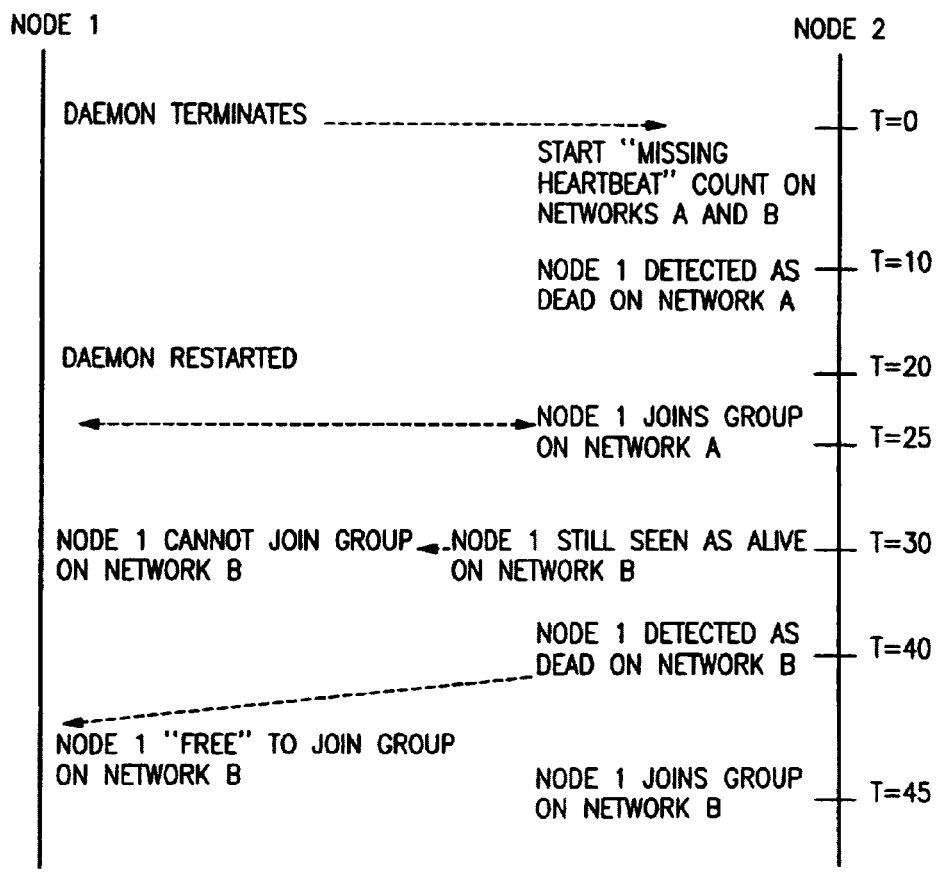
FIG. 6 is a time flow diagram which compares the activities in different nodes so as to illustrate consistency problems arising as a result of the quick restart of a daemon on Node 1.

FIG. 6 illustrates a scenario (sequence of specific events) in which an inconsistency could arise as the result of failure and rapid restart of Node #1. In this scenario it is assumed that the time that it takes Network A to detect a node failure, such as through the failure of the heartbeat daemon to receive a heartbeat message from its upstream neighbor, is less than the corresponding time for this same operation in Network B. For example, such a situation could easily arise if the networks are set up with different tunable parameters, such as the default adapter failure detection time-out value. In the example shown, it is assumed that the failure detection time for Network A is 10 seconds while the corresponding failure detection time for Network B is 40 seconds. In this scenario it is also assumed that Node #1 and Node #2 are part of an Adapter Membership Group on Networks A and B.

In FIG. 6 it is seen that at time T=0 (seconds being the assumed time unit), termination of the heartbeat daemon on Node #1 results in missing heartbeats occurring for this node in Networks A and B. However, because of the slower detection process on Network B, the death of Node #1 is not recognized until T=40. Nonetheless, on Network A, Node #1 is detected as having "died" at T=10. At T=20, the heartbeat daemon is restarted on Node #1 (this is the start of the "quick restart" phenomenon that gives rise to one of the problems considered herein; it should also be noted that the use of the adjective "quick" to describe the restart is meant to be a relative term: it is quick relative to the timing for node and/or adapter failure detection in a connected network of nodes.) With the "rebirth" of Node #1 in Network A it then joins a group on Network A at T=25. At T=30, Node #1 is still seen as being alive on Network B which has not as yet determined that is has failed. At T=40, the death of Node #1 is finally detected at Node #2. Node #1 is now "free" to join a group on Network B which Node #2 is capable of processing at T=45. At this point we potentially have Node #1 as part of a group in Network A and also a member of a different group in Network B. Nowhere in the sequence from T=0 to T=45 shown in FIG. 6 is Node #1 seen as being completely unreachable in both networks. Therefore, in the time frame considered, Node #1 is not ever seen as being dead.

Figure 7:
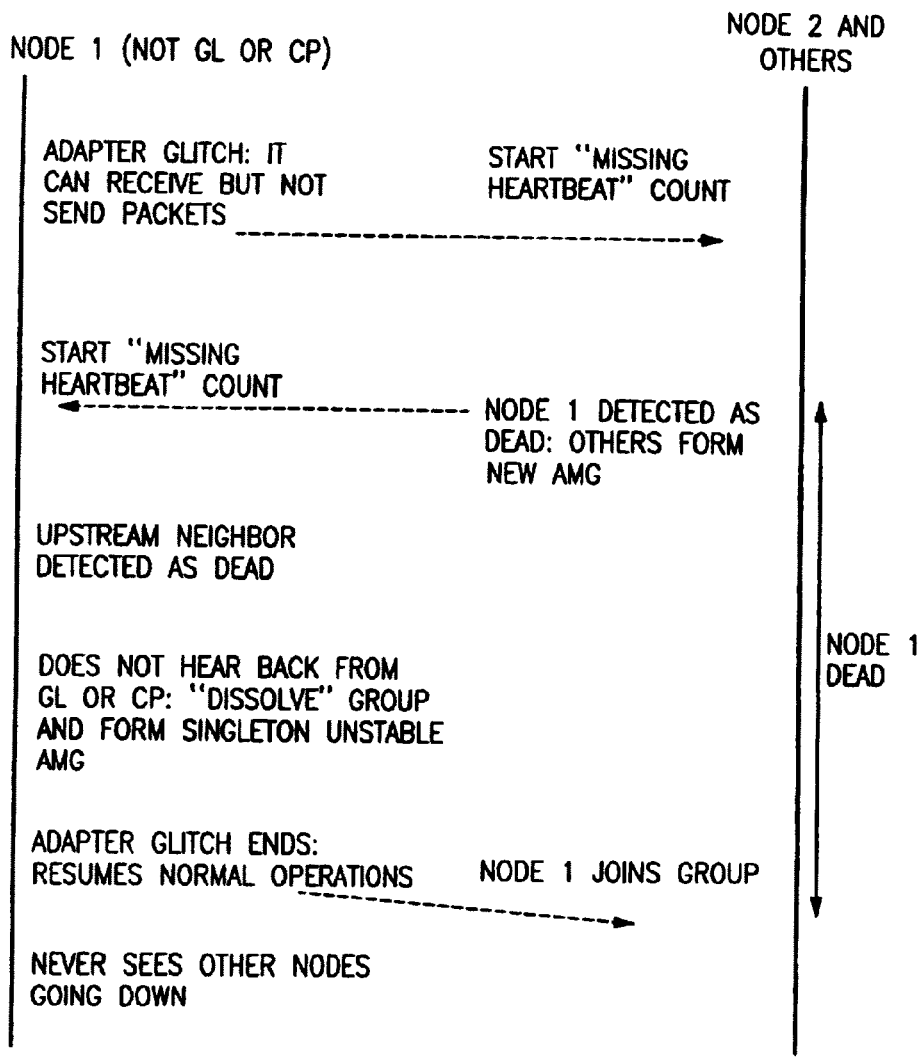
FIG. 7 is a time flow diagram which compares the activities in different nodes so as to illustrate consistency problems arising from temporary adapter communication failure.

FIG. 7 illustrates a sequence of events leading to an inconsistency caused by a temporary communication problem in a network adapter. In this example, neither Node #1 nor Node #2 are either the Group Leader nor the "Crown Prince," as these terms are used herein. Node #1 never "notices" other nodes as being down while the other nodes see Node #1 as being unreachable. The sequence of events illustrated in FIG. 8 begins when Node #1 experiences an adapter error (glitch) in which it can receive but not send messages (that is, message packets). At this time, at Node #2 (and others), the initial effects of a missing heartbeat message from Node #1 start to be "felt." Likewise, at Node #1, the effects of a missing heartbeat message from Node #2 are experienced after Node #1 is expelled from the group. At Node #1, the lack of a heartbeat message and responses from either the Group Leader or from the Crown Prince nodes forces Node #1 into the formation of a singleton group (a group with only one member). Such groups are inherently "unstable" as that term is used herein where it refers to the likelihood that any given node is soon apt to change its membership status. If and when the adapter problems at Node #1 end, it resumes normal operations and is able to rejoin the group. Because Node #1 formed a singleton unstable group, Node #1 does not perceive any of the other nodes as unreachable. At the same time, the other nodes do see Node #1 as reachable, thus producing an undesirable state of reachability inconsistency.

Figure 8:
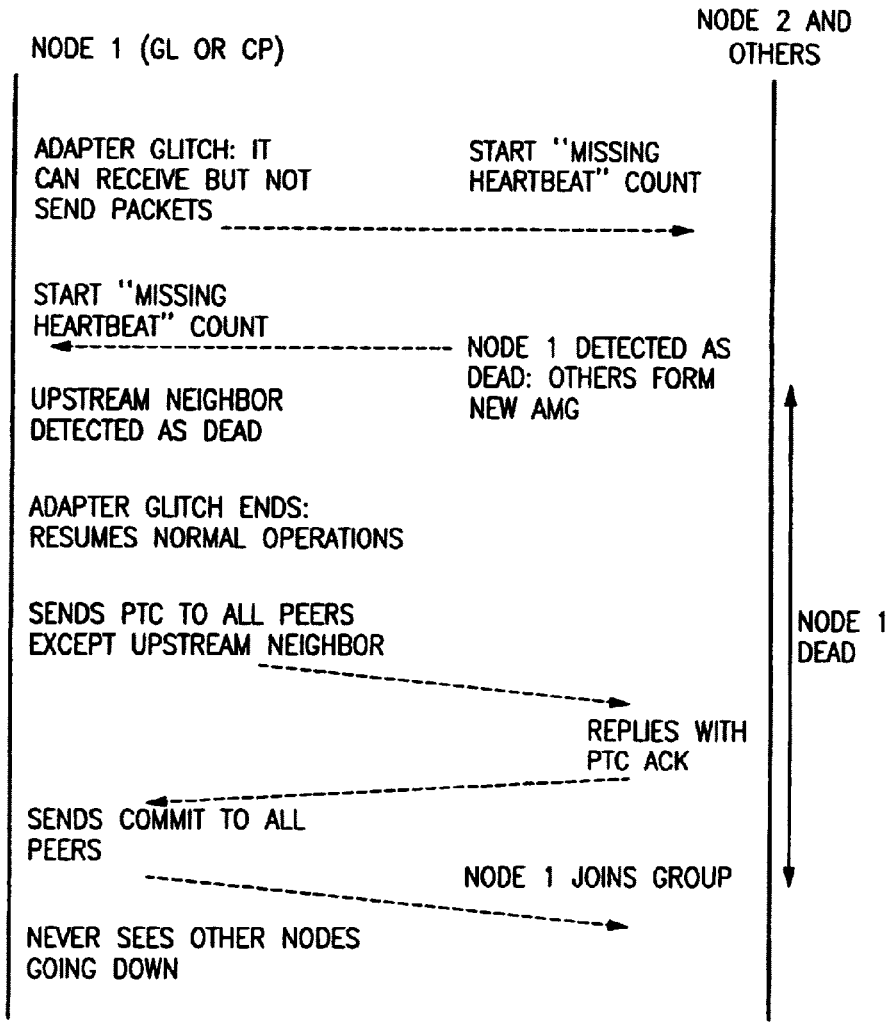
FIG. 8 is a time flow diagram which compares the activities in different nodes so as to illustrate consistency problems arising from a temporary adapter communication problem in which the problem node is the Group Leader or Crown Prince.

FIG. 8 is similar to FIG. 7 except that it illustrates the sequence of events that would occur in FIG. 7 if Node #1 had been either the Group Leader or the Crown Prince Node. As in FIG. 7, it is here assumed that the network adapter at Node #1 experiences a failure in which it is able to receive message packets but is not able to send them. When Node #2 and the other nodes in its group detect the fact that heartbeat messages are not being sent from the Group Leader (Node #1), Node #2 and the other nodes form a new Adapter Membership Group, without Node #1. As a result, no heartbeat messages are sent to Node #1 since it is not part of the new group formed with Node #2. Therefore, Node # 1 no longer receives heartbeat messages from its upstream neighbor, which it assumes has died. Node #1, still "thinking" that it has Group Leader status sends a PREPARE_TO_COMMIT (PTC) message to all of its network peers, except for the node which it assumes is its dead upstream neighbor. The group containing Node #2 replies with a PTC_ACK message and Node #1 replies to this message by sending a COMMIT message to all of its network peer nodes. Node #1 is thereafter made part of a new group (that is, the group formed by the protocol, as described above which, from Node #1's point of view is actually a DEATH protocol as opposed to a JOIN protocol. However, in this example, Node

1 never sees the other nodes as being unreachable while the other nodes do see Node #1 as being unreachable for the period of time illustrated (Node #1 dead).

Figure 9:
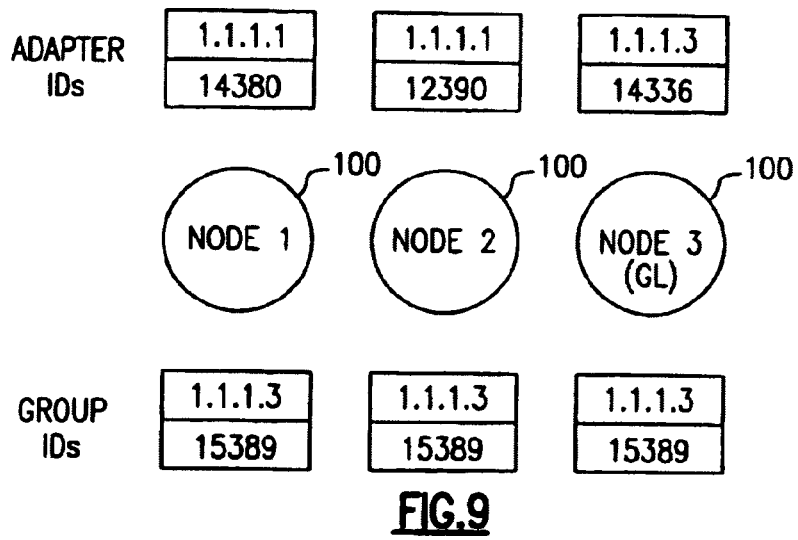
FIG. 9 is a schematic block diagram illustrating the structure of adapter IDs and Group IDs.

FIG. 9 depicts how Adapter IDs and Group IDs are created. Adapter IDs are formed with a pair of indicators: (IP address; instance number). The IP address is the adapter's IP address. The instance number is assigned when the adapter is initialized or reinitialized into a singleton group. This number is any uniquely selected number increasing with time; in particular, it is preferably derived from the time-of-day value. As also seen in FIG. 9, the Group ID also comprises a pair of indicators: (IP address; instance number). The address refers to the IP address of the adapter which is the Group Leader. The instance number is assigned at the time the group is formed. Each member of an AMG has a distinct Adapter ID, while all members of the group have the same Group ID.

Figure 10:
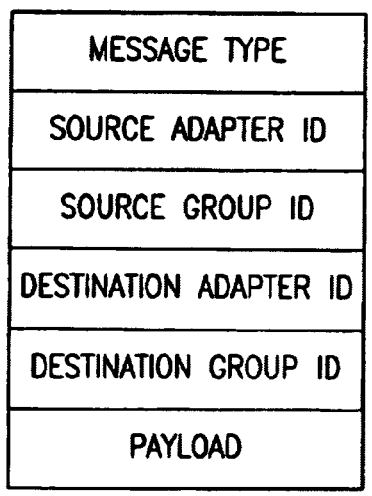
FIG. 10 is a block diagram illustrating the preferred format for the protocol message packets that are sent over the network.

FIG. 10 illustrates a preferable format for the packet that is sent from one daemon to another over the network. The packet includes a message type ("HEART BEAT," "PROCLAIM," etc.), the Adapter ID of the source of the message, the Group ID of the source of the message, the Adapter and Group ID of the destination of the message, and finally a "payload" area which is specific to each message type.

Figure 11:
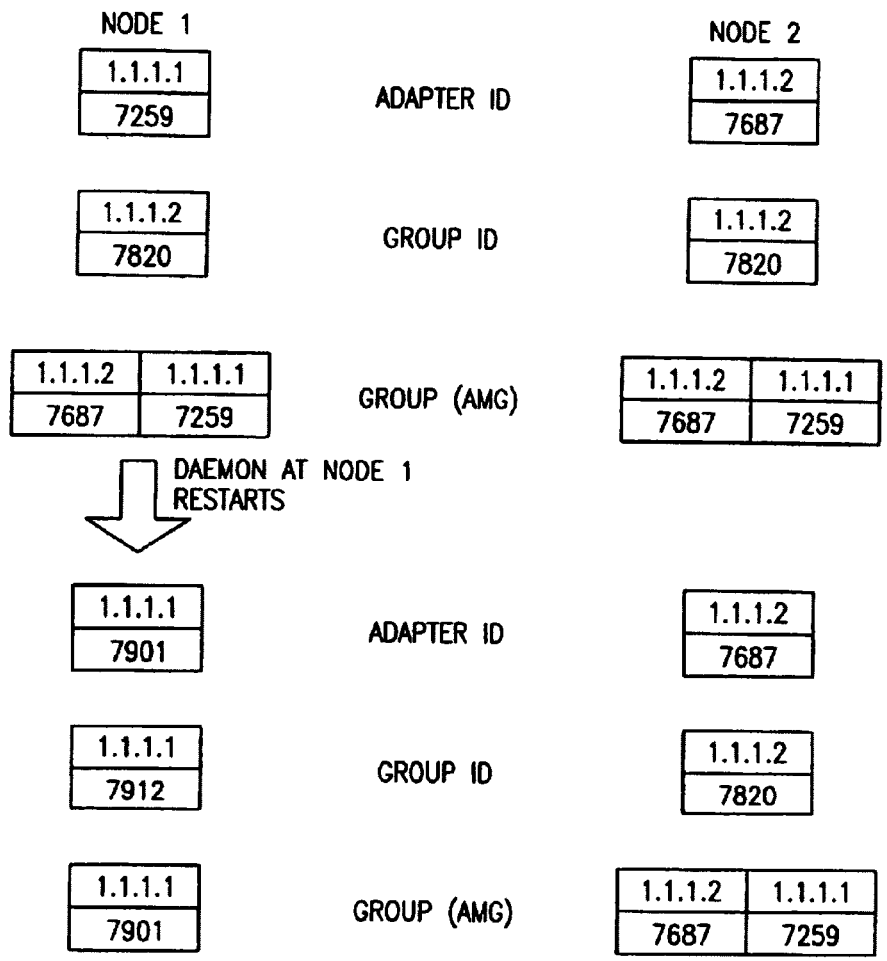
FIG. 11 is a schematic block diagram illustrating a sample structure for the adapter and group IDs when the daemon at Node 1 terminates and is restarted.

FIG. 11 illustrates how Adapter and Group IDs change over time in a scenario where the daemon at Node #1 terminates and is later restarted. When the daemon at Node #1 terminates, initially there is no change in Node #2's view, since not enough heartbeats are missed from Node #1. When the daemon at Node #1 is restarted, it has a new Adapter ID, Group ID, and the local adapter forms a singleton AMG.

Figure 12:
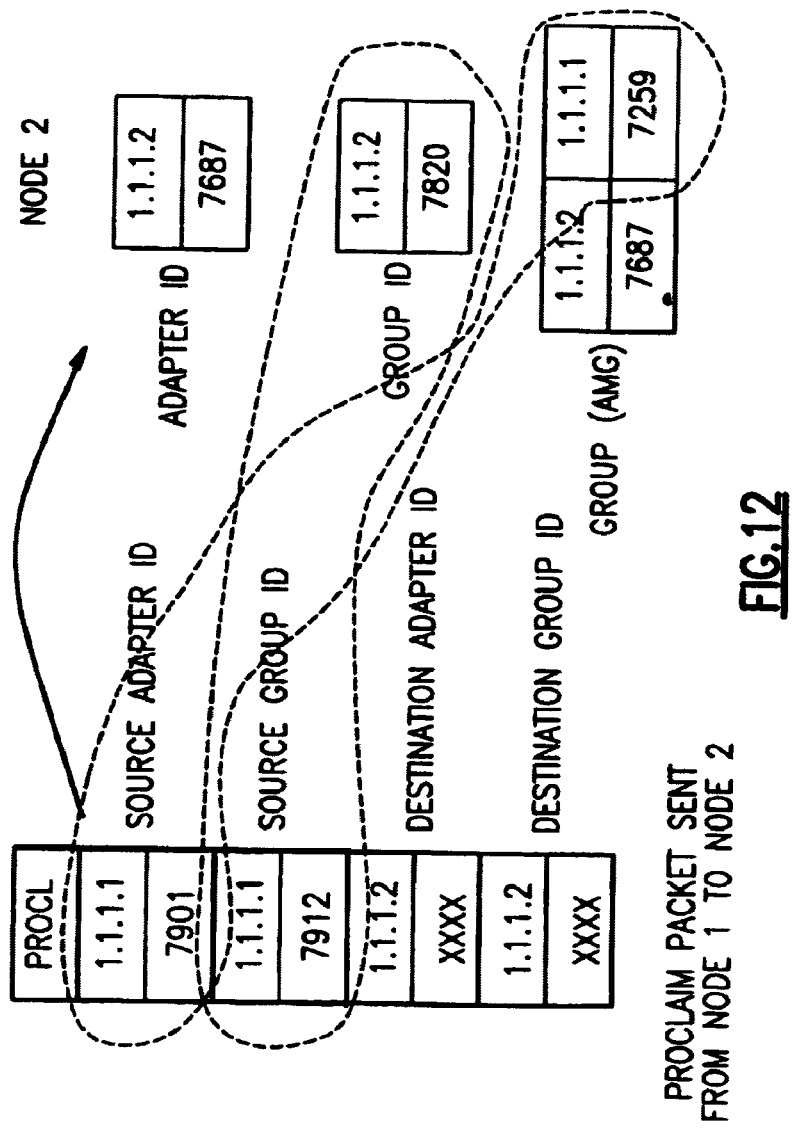
FIG. 12 is a schematic block diagram illustrating the processing that occurs when a live node detects that a remote daemon has restarted.

FIG. 12 builds on the scenario illustrated in FIG. 11. The adapter on Node #1 sends a "PROCLAIM" message that eventually reaches Node #2. The message reveals the following:

while the address part of the "source Adapter ID" ("1.1.1.1") can actually be found in Node #2's AMG, the instance number portions ("7259" in the AMG and "7901" in the message) do not match; and the Source Group ID in the message does not match the Group ID stored at Node #2.

The indication provided by the inconsistencies above is enough for Node #2 to determine that Node #1 bounced.

Figure 13B:
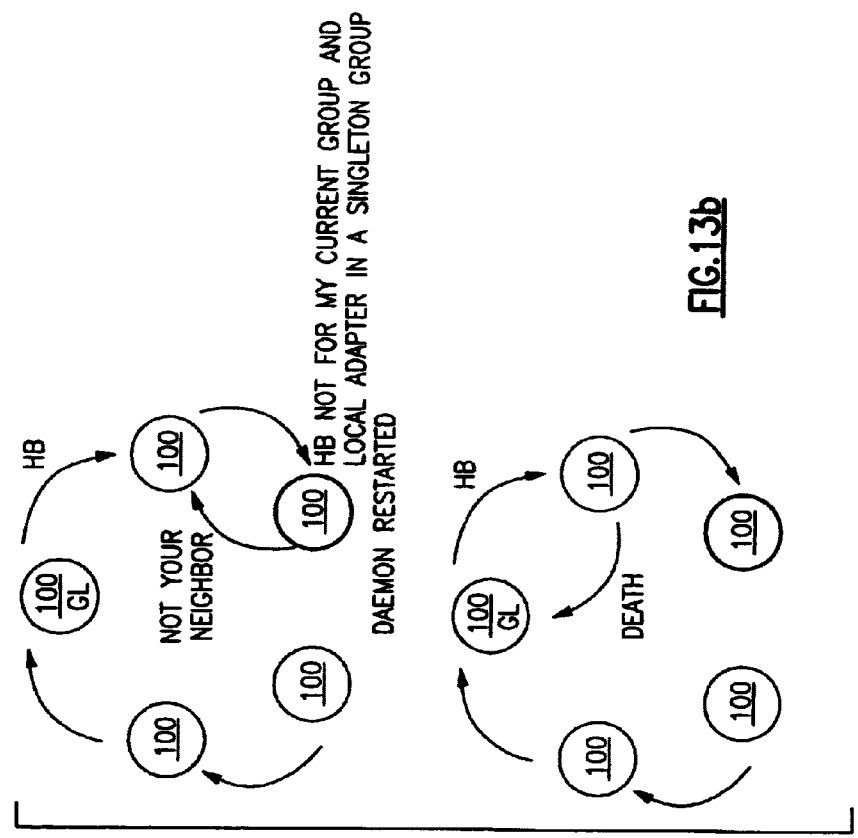
FIG. 13B is the second portion of FIG. 13A.
Figure 13A:
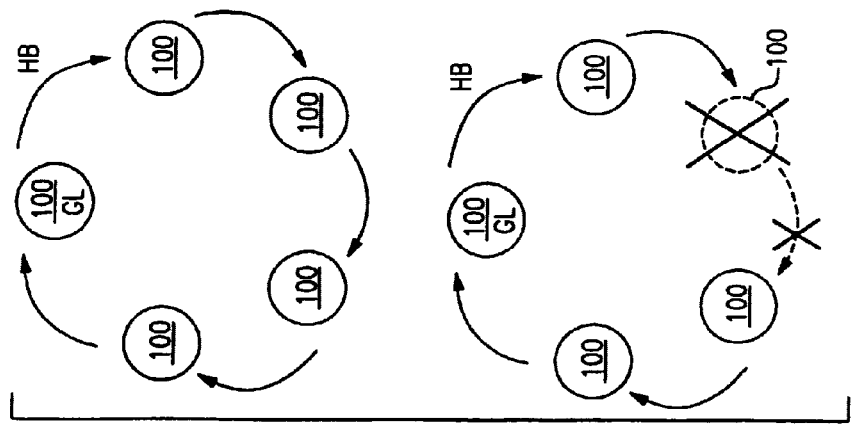
FIG. 13A is a schematic block diagram illustrates message flow that occurs when a daemon that is restarted detects the fact that a previous instance used to belong to an Adapter Membership Group because of the heartbeat messages that it receives while it is in a singleton group.

FIGS. 13A and 13B illustrate another mechanism used to detect the occurrence of a bounce. Initially (see FIG. 13A), the daemon at one of the nodes (that with the large "X") terminates, and therefore no more "HEART BEAT" messages are sent by it. The daemon is restarted on the same node. The daemon then starts receiving "HEART BEAT" messages from the previous instance's upstream neighbor (see FIG. 13B). Upon receiving such messages, the node notices that:

the messages are not intended for the node's current Group ID; and the current group is singleton.

The inconsistencies above are interpreted as the recipient node having bounced. In response to the "HEART BEAT" message, it sends a "NOT YOUR NEIGHBOR" response back to the sender, which in turn sends a "DEATH" message to the Group Leader, informing it about the demise of the bounced node.

FIGS. 14A through 14D illustrate an example of the Quick Communication Interruption problem. Initially (see FIG. 14A), three nodes belong to the AMG. Note that the Group IDs, AMG, and "last_stable_group" are the same across all three nodes. At this point, the adapter at Node #3 (the Group Leader) is assumed to suffer a temporary outage. FIG. 14B shows the results of Node #2 (the new Group Leader) expelling Node #3 from the group with the result that the Group ID, AMG, and "last_stable_group" all change to reflect the formation of the new group. Meanwhile, Node #3 has still not missed enough "HEART BEAT" messages to take any action. In FIG. 14C, Node #3 finally misses enough "HEART BEAT" messages to declare its upstream neighbor "down" and to send a "PTC" message to Node #2. The PTC message has its "in_previous_stable_group" indicator set equal to 1, since the recipient ("1.1.1.2") is still listed as part of "last_stable_group" on Node #3. On the other hand, the sender of the message ("1.1.1.3") does not belong to the recipient's "last_stable_group." The inconsistency between the latter and the value "1" in the value of "in_previous_stable_group" leads the recipient to reject the message. Since all of the PTCs sent by Node #3 are rejected, Node #3 eventually forms a singleton group (see FIG. 14D), at which points it declares all remaining nodes as down. The next PTC sent by Node #3 has its "in_previous_stable_group" indicator set equal to 0, which prompts Node #2 to accept the message. Thus, the goal of having Node #3 perceive all other nodes as down (in symmetry to Node #3 itself having been seen as down by the others) is achieved.

Figure 15D:
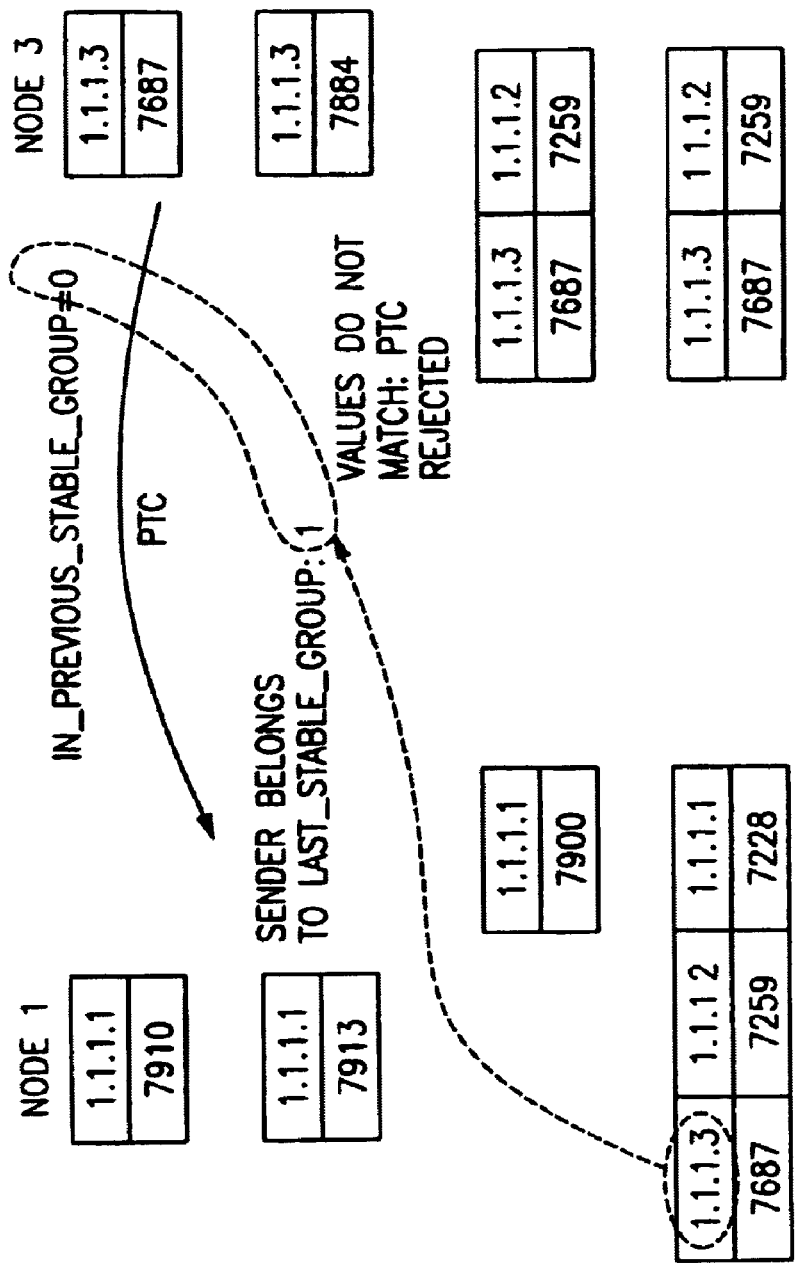
Figure 15E:
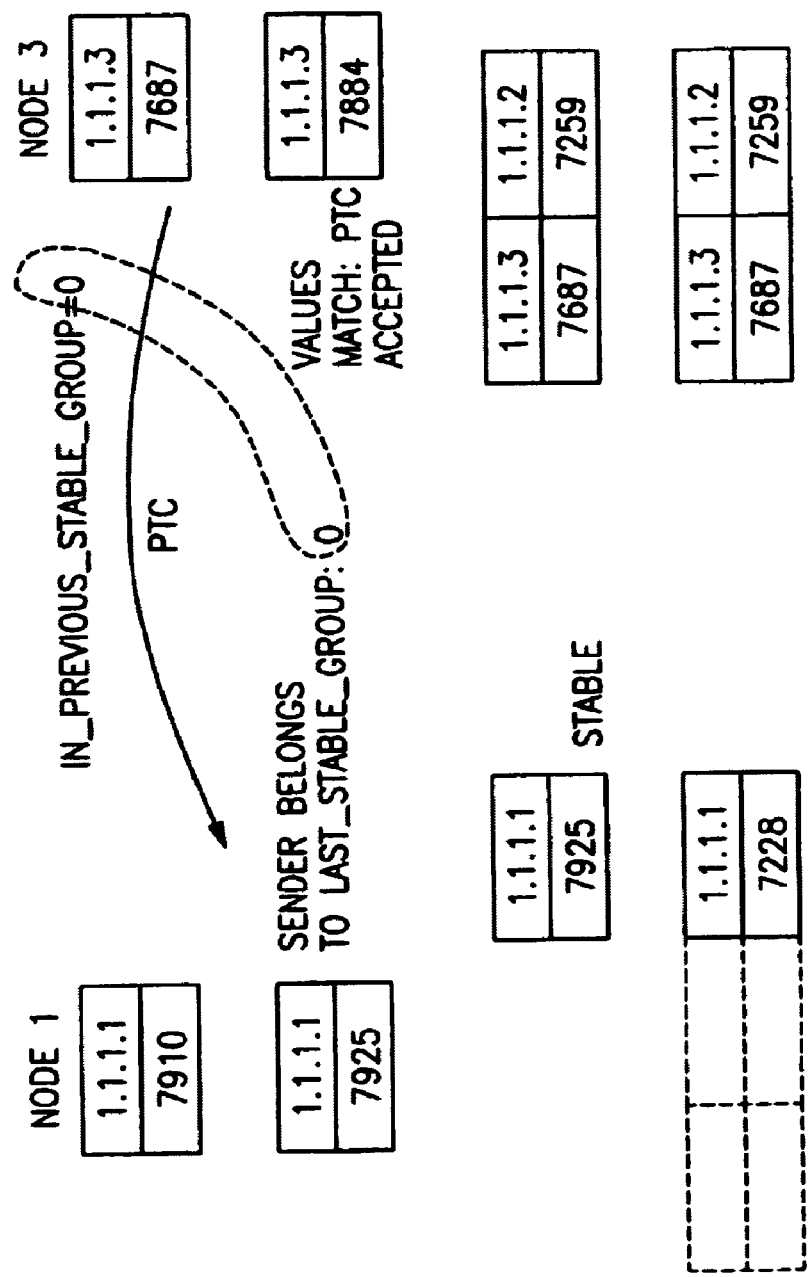

FIGS. 15A through 15E are similar to FIG. 14, but they focus on Node #1, which is not the Group Leader. Initially (see FIG. 15A) all the nodes have the same view of the group membership. When an outage occurs on Node #1's adapter, it is expelled from Node #3's group, as shown in FIG. 15B. In this figure, the instance number of Node #3's Group ID is changed to reflect the new group which excludes Node #1. FIG. 15C shows Node #1 dissolving its AMG—after it started missing "HEART BEAT" messages, sent a "DEATH" message, but did not get a "PTC" message. While Node #1 forms a new AMG with a new Group ID, the AMG is unstable and therefore does not cause a change in "last_stable_group." When Node #1's adapter recovers, a "PTC" message from Node #3 finally reaches Node #1 (FIG. 15D). The "in_previous_stable group" indicator in the message has value 0, since Node #1 does not belong to Node #3's "last stable_group." On the other hand, Node #1 still has Node #3 as belonging to its version of "last_stable_group." Therefore again there is an inconsistency, which prompts Node #1 to reject the "PTC" message. Eventually (see FIG. 15E), Node #1 forms a stable AMG, which finally causes "last_stable_group" to change. Because then the sender of the "PTC" is no longer part of Node #1's "last_stable_group," the inconsistency disappears, and the "PTC" is finally accepted. Thus, here too, the goal of having Node #1 see all of the other nodes as "down" (since all the other nodes saw Node #1 as down) is now satisfied.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. In a distributed, multinode data processing system in which nodes communicate via adapters coupled to each node, a method for detecting node reachability inconsistencies in the presence of temporary communication failure or temporary daemon blockage, said method comprising:

upon detecting at a first node conditions suitable for instituting change in adapter group membership, sending to a recipient node, a message indicative of previous membership of said first node in a stable adapter membership group upon the condition that said recipient node is also indicated as being part of said stable group; and initiating a group join protocol in which said message is rejected by a recipient node under a condition selected from the group of conditions consisting of (1) said message includes indicia showing that the sending node and the recipient node are in the same adapter membership class, said indicia being in conflict with corresponding indicia stored within said recipient node; and (2) said message includes indicia showing that the sending node and the recipient node are in different adapter membership classes, said indicia being in conflict with corresponding indicia stored within said recipient node.

2. The method of claim 1 in which said conditions include failure to detect heartbeat messages at said first node.

3. The method of claim 2 further including a step in which said first node, after its first message is rejected, transmits a second message which is indicative of nonmembership in a previously stable group, whereby the goal of having the sender and receiver agree on adapter group membership is advanced.

4. The method of claim 3 further including the step of processing said second message so as to provide mutually consistent views of the liveness of nodes in the membership group.

5. A multinode data processing system comprising:

a plurality of data processing nodes connected in a network capable of transmitting messages between nodes;

storage mails within said nodes containing program code for transmitting from a sending node to a recipient node, upon detecting, at said sending node, conditions suitable for instituting change in adapter group membership, a message indicative of previous membership of said sending node in a stable adapter membership group upon the condition that said recipient node is also indicated as being part of said stable group and for initiating a group join protocol in which said message is rejected by a recipient node under a condition selected from the group of conditions consisting of (1) said message includes indicia showing that the sending node and the recipient node are in the same adapter membership class, said indicia being in conflict with corresponding indicia stored within said recipient node; and (2) said message includes indicia showing that the sending node and the recipient node are in different adapter membership classes, said indicia being in conflict with corresponding indicia stored within said recipient node.

6. The data processing system of claim 5 in which said program code further includes means for transmitting from said first node, after its first message is rejected, a second message which is indicative of nonmembership in a previously stable group, whereby the goal of having the sender and receiver agree on adapter group membership is advanced.

7. The data processing system of claim 6 in which said program code further includes means for processing said second message so as to provide mutually consistent views of the liveness of nodes in the membership group.

8. A program product comprising machine readable medium containing program code for use in a multinode data processing system for transmitting to a recipient node, upon detecting at a first node, conditions suitable for instituting change in adapter group membership, a message indicative of previous membership of said first node in a stable adapter membership group upon the condition that said recipient node is also indicated as being part of said stable group and for initiating a group join protocol in which said message is rejected by a recipient node under a condition selected from the group of conditions consisting of (1) said message includes indicia showing that the sending node and the recipient node are in the same adapter membership class, said indicia being in conflict with corresponding indicia stored within said recipient node; and (2) said message includes indicia showing that the sending node and the recipient node are in different adapter membership classes, said indicia being in conflict with corresponding indicia stored within said recipient node.

9. The program product of claim 8 further including means for transmitting from said first node, after its first message is rejected, a second message which is indicative of nonmembership in a previously stable group, whereby the goal of having the sender and receiver agree on adapter group membership is advanced.

10. The program product of claim 9 further including means for processing said second message so as to provide mutually consistent views of the liveness of nodes in the membership group.

* * * * *